(12) United States Patent
Gupta et al.

(10) Patent No.: US 11,321,278 B2
(45) Date of Patent: May 3, 2022

(54) LIGHT-WEIGHT INDEX DEDUPLICATION AND HIERARCHICAL SNAPSHOT REPLICATION

(71) Applicant: Rubrik, Inc., Palo Alto, CA (US)

(72) Inventors: Anshul Gupta, Mountain View, CA (US); Abdullah Reza, Gilroy, CA (US); Guilherme Vale Ferreira Menezes, San Jose, CA (US)

(73) Assignee: RUBRIK, INC., Palo Alto, CA (US)

( * ) Notice: Subject to any disclaimer, the term of this patent is extended or adjusted under 35 U.S.C. 154(b) by 147 days.

(21) Appl. No.: 16/862,470

(22) Filed: Apr. 29, 2020

(65) Prior Publication Data

US 2021/0342297 A1 Nov. 4, 2021

(51) Int. Cl.
| | |
|---|---|
| *G06F 16/13* | (2019.01) |
| *G06F 16/14* | (2019.01) |
| *G06F 16/174* | (2019.01) |
| *G06F 16/11* | (2019.01) |

(52) U.S. Cl.
CPC .......... *G06F 16/128* (2019.01); *G06F 16/137* (2019.01); *G06F 16/152* (2019.01); *G06F 16/1748* (2019.01)

(58) Field of Classification Search
CPC .... G06F 16/128; G06F 16/137; G06F 16/152; G06F 16/1748
USPC ........................................................ 707/649
See application file for complete search history.

(56) References Cited

U.S. PATENT DOCUMENTS

| | | | | |
|---|---|---|---|---|
| 8,370,309 | B1 * | 2/2013 | Ramarao | G06F 3/0689 707/664 |
| 8,489,611 | B2 * | 7/2013 | Tofano | G06F 7/00 707/741 |
| 8,572,042 | B2 * | 10/2013 | Leppard | G06F 16/90 707/660 |
| 8,832,034 | B1 * | 9/2014 | Ramarao | G06F 16/1748 707/664 |
| 9,092,151 | B1 * | 7/2015 | Floyd | G06F 16/215 |
| 9,208,162 | B1 * | 12/2015 | Hallak | G06F 16/9014 |
| 9,286,003 | B1 * | 3/2016 | Hallak | G06F 16/9014 |
| 9,336,143 | B1 * | 5/2016 | Wallace | G06F 3/0641 |
| 9,813,467 | B1 * | 11/2017 | Barrett | G06F 16/24568 |
| 10,101,943 | B1 * | 10/2018 | Ayzenberg | G06F 11/2038 |
| 10,229,056 | B1 * | 3/2019 | Panidis | G06F 3/065 |

(Continued)

OTHER PUBLICATIONS

Zhong et al., "FLIC: Fast, Lightweight Checkpointing for Mobile Virtualization using NVRAM", 2016 Design, Automation & Test in Europe Conference & Exhibition (DATE), Mar. 14-18, 2016, IEEE, pp. 1562-1567. (Year: 2016).*

*Primary Examiner* — Phuong Thao Cao
(74) *Attorney, Agent, or Firm* — Schwegman Lundberg & Woessner, P.A.

(57) ABSTRACT

A lightweight deduplication system can perform resource efficient data deduplication using an extent index and a content index. The extent index can store full fingerprints of data segments to be deduplicated and the content index can store shortened versions of the full fingerprints. The system can alternate between the extent and content indexes, and cache portions of the indices to perform lightweight data deduplication. Further, the system can be configured with an efficient heuristic approach for selecting content index data lookups for chains of volumes for deduplication, such as a long chain of snapshots.

20 Claims, 18 Drawing Sheets

(56) References Cited

U.S. PATENT DOCUMENTS

| | | | | |
|---|---|---|---|---|
| 10,452,297 | B1* | 10/2019 | Karr | G06F 3/0673 |
| 10,565,183 | B1* | 2/2020 | Colgrove | G06F 3/0665 |
| 10,853,130 | B1* | 12/2020 | Barrett | G06F 15/163 |
| 10,970,393 | B1* | 4/2021 | Stiles | G06F 21/552 |
| 11,003,629 | B2* | 5/2021 | Alkalay | G06F 16/1752 |
| 2011/0113013 | A1* | 5/2011 | Reddy | G06F 11/1453 |
| | | | | 707/646 |
| 2011/0276780 | A1* | 11/2011 | Sengupta | G06F 12/0862 |
| | | | | 711/216 |
| 2013/0110783 | A1* | 5/2013 | Wertheimer | G06F 11/14 |
| | | | | 707/646 |
| 2013/0151562 | A1* | 6/2013 | Fujii | G06F 16/1748 |
| | | | | 707/780 |
| 2014/0310476 | A1* | 10/2014 | Kruus | G06F 12/0871 |
| | | | | 711/133 |
| 2015/0019816 | A1* | 1/2015 | Akirav | G06F 12/0848 |
| | | | | 711/129 |
| 2015/0039902 | A1* | 2/2015 | Arya | G06F 7/74 |
| | | | | 713/189 |
| 2015/0234710 | A1* | 8/2015 | Berrington | G06F 16/128 |
| | | | | 707/664 |
| 2016/0026653 | A1* | 1/2016 | Caro | G06F 16/1752 |
| | | | | 707/692 |
| 2016/0124676 | A1* | 5/2016 | Jain | G06F 3/0619 |
| | | | | 713/176 |
| 2016/0210242 | A1* | 7/2016 | Fontenot | G06F 3/0647 |
| 2018/0253255 | A1* | 9/2018 | Jain | G06F 3/0673 |
| 2019/0205413 | A1* | 7/2019 | Chung | G06F 16/1748 |
| 2019/0235778 | A1* | 8/2019 | Jin | G06F 3/0608 |
| 2019/0243547 | A1* | 8/2019 | Duggal | G06F 3/0619 |
| 2019/0332300 | A1* | 10/2019 | Singh | G06F 3/0608 |
| 2019/0340262 | A1* | 11/2019 | O'Hare | G06F 16/1748 |
| 2019/0342594 | A1* | 11/2019 | Korte | H04N 21/2407 |
| 2020/0134051 | A1* | 4/2020 | Alkalay | G06F 16/1752 |
| 2020/0241778 | A1* | 7/2020 | Bassov | G06F 3/061 |
| 2020/0249860 | A1* | 8/2020 | Faibish | G06F 3/0673 |
| 2020/0250144 | A1* | 8/2020 | Natanzon | G06F 16/188 |
| 2020/0285664 | A1* | 9/2020 | Maybee | G06F 9/45558 |
| 2020/0327096 | A1* | 10/2020 | Witte | G06F 16/137 |
| 2020/0327102 | A1* | 10/2020 | Zhang | G06F 11/1453 |
| 2021/0034249 | A1* | 2/2021 | Armangau | G06F 12/0864 |
| 2021/0034349 | A1* | 2/2021 | Hatakeyama | G06F 16/1744 |
| 2021/0034583 | A1* | 2/2021 | Cerny | G06F 21/606 |
| 2021/0064589 | A1* | 3/2021 | Wang | G06F 16/1748 |
| 2021/0109900 | A1* | 4/2021 | McIlroy | G06F 16/137 |
| 2021/0132838 | A1* | 5/2021 | Goswami | G06F 3/0641 |
| 2021/0133177 | A1* | 5/2021 | Goswami | G06F 16/2272 |
| 2021/0157777 | A1* | 5/2021 | Yang | G06F 16/1748 |
| 2021/0194673 | A1* | 6/2021 | Collins | H04L 9/3239 |
| 2021/0278981 | A1* | 9/2021 | Patel | G06F 3/0641 |
| 2021/0286768 | A1* | 9/2021 | Kucherov | G06F 16/1748 |
| 2021/0326213 | A1* | 10/2021 | Slater | G06F 11/1453 |

* cited by examiner

1200

1202 ACCESSING THE SNAPSHOT AT A SOURCE CLUSTER

1204 ESTABLISHING A REPLICATION HIERARCHY

1206 STORING, IN A SPARSE PATCH FILE (P), ONLY WRITTEN OR MODIFIED DATA BLOCKS IN THE SNAPSHOT, AS AN OFFSET TO A DATA MAP

1208 GENERATING, BASED ON THE PATCH FILE, A SPARSE EXTENT INDEX (EI) FILE, THE EXTENT INDEX FILE STORING AN OFFSET TO FINGERPRINT HASH OR VALUE FOR EACH WRITTEN OR MODIFIED BLOCK PRESENT IN THE PATCH FILE

1210 GENERATING, BASED ON THE EXTENT INDEX, A NON-SPARSE FINGERPRINT (FP) FILE REPRESENTING AN ENTIRE LOGICAL SPACE OF THE SNAPSHOT

1212 TRANSMITTING OR PULLING AT LEAST ONE OR MORE OF THE FILES IN THE REPLICATION HIERARCHY OVER THE WAN

1214 BASED ON THE ONE OR MORE TRANSMITTED OR PULLED FILES, REPLICATING THE SNAPSHOT AT THE REMOTE CLUSTER

1302 ACCESSING A SERIES OF SNAPSHOTS AT A SOURCE CLUSTER

1304 GENERATING OR IDENTIFYING, FOR EACH SNAPSHOT AT THE SOURCE CLUSTER, A REPLICATION HIERARCHY, EACH REPLICATION HIERARCHY INCLUDING A SPARSE PATCH FILE (P), A SPARSE EXTENT INDEX (EI) FILE, AND A NON-SPARSE FINGERPRINT (FP) FILE

1306 FOR A MOST RECENT SNAPSHOT IN THE SERIES OF SNAPSHOTS AT THE SOURCE CLUSTER, COPYING THE NON-SPARSE FP FILE OVER THE WAN AT LEAST TO INITIATE ESTABLISHMENT OF A MOST RECENT SNAPSHOT AT THE REMOTE CLUSTER CORRESPONDING TO THE MOST RECENT SOURCE SNAPSHOT

1308 CREATING A SPARSE EI FILE AT THE REMOTE CLUSTER FOR THE MOST RECENT REMOTE SNAPSHOT BY PULLING THE CORRESPONDING EI FILE IN THE MOST RECENT SOURCE SNAPSHOT, OVER THE WAN, FROM THE SOURCE CLUSTER

1402 ACCESSING A SERIES OF SNAPSHOTS AT A SOURCE CLUSTER, THE SERIES OF SNAPSHOTS AT THE SOURCE CLUSTER INCLUDING AT LEAST FIRST, SECOND, AND THIRD SNAPSHOTS IN A CONSECUTIVE TIME-BASED SERIES, AND WHEREIN THE THIRD SNAPSHOT INCLUDES A MOST RECENT SOURCE SNAPSHOT, AND WHEREIN THE SECOND SNAPSHOT HAS FAILED OR IS OTHERWISE UNAVAILABLE FOR REPLICATION AT THE REMOTE CLUSTER

1404 GENERATING OR IDENTIFYING, FOR EACH SNAPSHOT IN THE SERIES OF SNAPSHOTS AT THE SOURCE CLUSTER, A REPLICATION HIERARCHY, EACH REPLICATION HIERARCHY INCLUDING A SPARSE PATCH FILE (P), A SPARSE EXTENT INDEX (EI) FILE, AND A NON-SPARSE FINGERPRINT (FP) FILE WHEREIN EACH FINGERPRINT IN AN FP FILE INCUDES AN OFFSET RELATIVE TO A DATA MAP

1406 COPYING THE NON-SPARSE FP FILE FROM THE THIRD, MOST RECENT SNAPSHOT OVER THE WAN AT LEAST TO INITIATE ESTABLISHMENT OF A MOST RECENT REMOTE SNAPSHOT AT THE REMOTE CLUSTER CORRESPONDING TO THE THIRD SNAPSHOT

1408 CREATING A SPARSE EI FILE AT THE REMOTE CLUSTER FOR THE MOST RECENT REMOTE SNAPSHOT BY PULLING THE CORRESPONDING EI FILE FROM THE THIRD SNAPSHOT, OVER THE WAN, FROM THE SOURCE CLUSTER

LIGHT-WEIGHT INDEX DEDUPLICATION AND HIERARCHICAL SNAPSHOT REPLICATION

TECHNICAL FIELD

The present disclosure generally relates to special-purpose machines that manage database processes and improvements to such variants, and to the technologies by which such special-purpose machines become improved compared to other special-purpose machines for performing data deduplication.

More specifically, some examples relate to hierarchical replication with minimal data transfer and deduplication and data integrity.

BACKGROUND

Data duplication is a computational task for eliminating duplicate copies of repeating data in a data storage system. For example, a storage device may store two volumes, where each volume shares some of the same data. To save storage space and decrease computational overhead, the two volumes can be deduplicated by replacing deduplicate data items in one of the volumes with pointers or references to the location of the duplicate data in the other volume. While deduplicating decreases storage space, the processes of deduplicating the data can be computationally intensive and may not perform well if the data to be deduplicated is very large or if resource-limited devices, such as hardware having a small amount of memory, are used to perform deduplication.

For data replication over a Wide Area Network (WAN), bandwidth utilization is an important constraint, and it can be an advantage to minimize the amount of data that is required to be transferred over the WAN. Some efforts to minimize data replication or transfer include deduplication.

SUMMARY

Example systems and methods include generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segment having a same position in the first dataset and the second dataset, the duplicate non-aligned segments having different positions in the first dataset and the second dataset.

Example systems and methods are provided to replicate snapshots over a WAN to a remote target cluster with minimal data transfer and efficient deduplication. Some examples include a data integrity check performed at the target cluster. Some examples employ a hierarchical approach, for example including a replication hierarchy, in order to minimize or reduce data transfer loads. Some examples include deduplication techniques to achieve additional data reduction. Some examples utilize hierarchical data representation, to enable data integrity checks of a replicated snapshot.

BRIEF DESCRIPTION OF THE DRAWINGS

To easily identify the discussion of any particular element or act, the most significant digit or digits in a reference number refer to the figure ("FIG.") number in which that element or act is first introduced.

FIGS. 12-14 show operations in methods of replicating a source cluster snapshot at a remote cluster using hierarchical replication, according to some example embodiments.

DETAILED DESCRIPTION

Figure 1A:
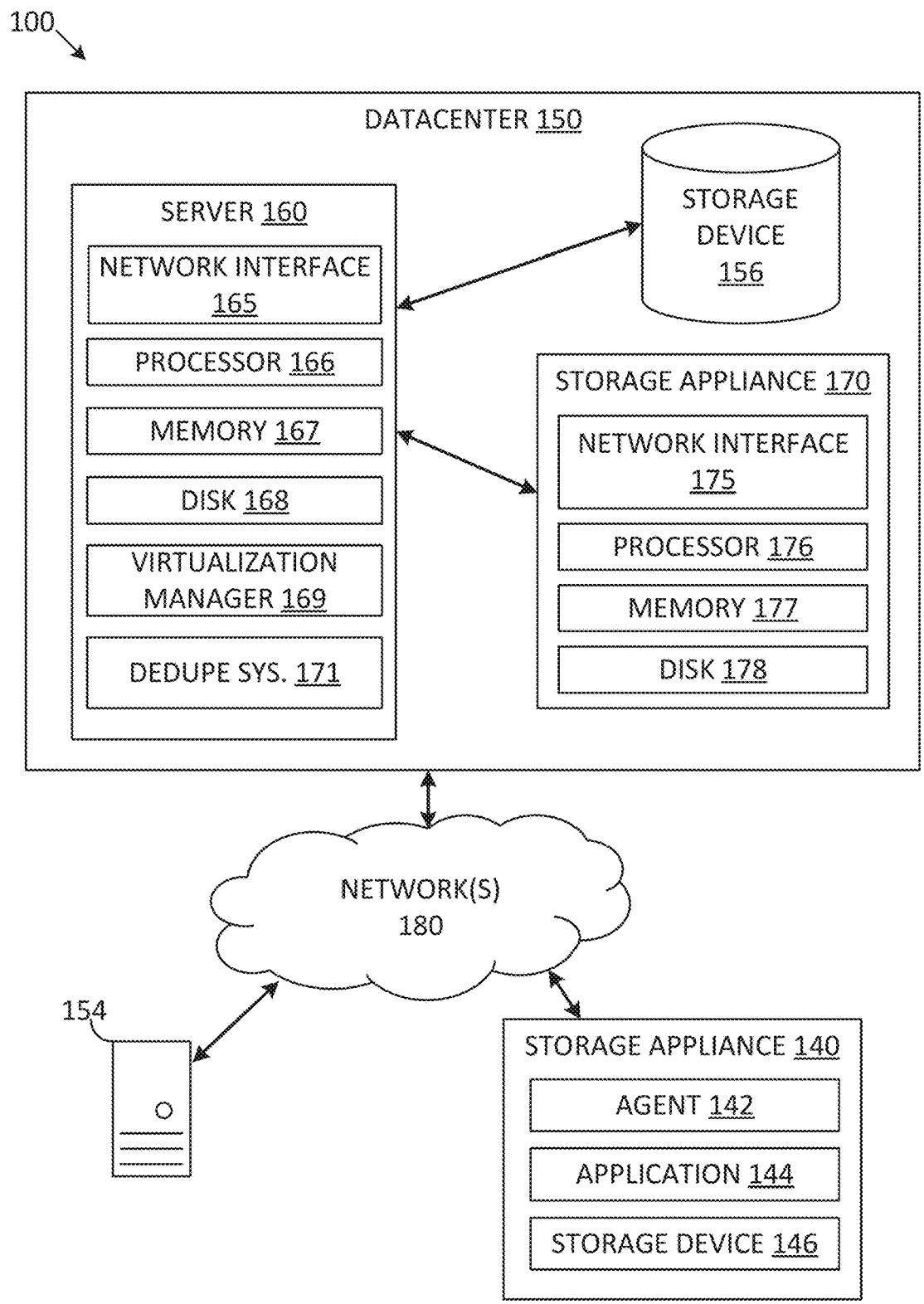
FIG. 1A depicts a networked computing environment in which the disclosed technology may be practiced, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, deduplication processes may not perform well on resource-constrained devices, such as a device with low processor power or memory, or when the data to be deduplicated is large in size. To this end, a lightweight deduplication system can be implemented to perform lightweight duplication by alternating between an extent index, which is used as a source of truth, and a content index that is optimized for space and performance. In some example embodiments, when a first volume V1 is written to storage, it is separated into segments (e.g., 64K), and each of the segments is hashed. The full hash of each segment is stored in the extent index as a unique fingerprint, and a shortened version of the hash is stored in the content index, according to some example embodiments. When a second volume V2 is to be written to the storage, the second volume V2 is segmented and extent and content index entries are created for each segment of the second volume V2. In some example embodiments, a lightweight deduplication system checks for aligned hash segments between the volumes, followed by performing a non-aligned hash search using the content index. If an aligned hash is found for a given segment in the second volume V2, then instead of writing that segment of the second volume V2 to storage, a reference or pointer to the aligned segment in the first volume V1 is written, thereby avoiding duplicate entries across the volumes V1 and V2.

Alternatively, and in accordance with some example embodiments, if the aligned hashes do not match, then the content index is searched using the shortened or truncated versions, and matching shortened versions are validated by consulting the extent index for the matching non-aligned shortened hash versions. In consulting the extent index as a source of truth, if the full hash in the extent indices of the respective volumes match, then the non-aligned segment in the second volume V2 is not written and a pointer or reference to the matching segment in the first V1 is written instead. For sequentially written data, e.g., snapshot data that is sequential in the order of tens of megabytes, the lightweight deduplication system approach of checking the extent and content indices for aligned and non-aligned segments can greatly increase deduplication efficiency in a way that is practical to implement on different types of devices, including hardware-constrained devices. Although SHA1 is discussed here as a fingerprint example, it is appreciated that other hash functions or fingerprint mechanisms can likewise be implemented, such as SHA3, MD5, Rabin fingerprint, and so on.

In some example embodiments, the lightweight deduplication system 171 of FIG. 1A can increase efficiency by caching the content index and then checking the extent index only if matching segment data is found in the cached data. For example, 8 megabytes (MB) of the content index cache is stored in local memory (e.g., flash, RAM) and the cached content is checked every 8 MB of the data being deduplicated (e.g., check the cache for every 8 MB of data from the second volume V2 to be written). If there is a content index cache hit between the segment at the 8 MB location in the volume V2, then the next 32 MB of full fingerprints from the extent index are cached and checked in memory. Where the data being deduped is sequential in structure (e.g., snapshots of a virtual disk), the next 32 MB of the fingerprints are likely to be hits because sequential data is local in nature (e.g., neighboring data items are contextually related, e.g., part of the same dataset, same application, and more likely to be stored near each other). If the next 32 MB of full fingerprints are hits, then references or pointers to the existing matching segments (e.g., in earlier volumes) are created in the second volume V2 in the storage device.

In some example embodiments, the lightweight deduplication system 171 can perform deduplication of multiple chained volumes using the extent and content indices of exiting volumes in a heuristic approach that further increases efficiency. For example, where a chain of fifty volumes exists, a limit can be configured to only analyze the content indices of a highest ranking set of the volumes. In some example embodiments, the highest ranking volumes in the set are tracked using a hit counter that tracks how often a given volume previously had a cache hit. For example, the last 512 lookups for each volume are tracked and updated for every hit. When the new volume is to be deduped against the chain of fifty volumes, there is a preconfigured limit set that only seven of the volumes will be deduplicated against, where each of the seven volumes is checked according to which have the highest hit count numbers. In this way, when the data is sequential and chained, the highest ranked volumes are likely to have large sections of identical data that can be deduplicated. In some example embodiments, when two or more of the volumes have identical hits for the last 512 lookups (e.g., all volumes have zero hits, or two volumes each have 50 hits), then the lightweight deduplication system 171 selects one of the volumes at random followed by the other volumes. In some example embodiments, the hit counter approach is combined with the alternating aligned and non-aligned segment deduplication and the caching approach to increase deduplication efficiency on resource-constrained devices.

FIG. 1A depicts one embodiment of a networked computing environment 100 in which the disclosed technology may be practiced. As depicted, the networked computing environment 100 includes a datacenter 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a work station, a laptop computer, a tablet computer, a desktop computer, or an information processing system. The other storage devices may include, for example, a storage area network storage device, a networked-attached storage device, a hard disk drive, a solid-state drive, or a data storage system.

The datacenter 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the datacenter 150 to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server (e.g., a web server hosting an auto-parts website). The storage device 156 may include one or more hardware storage devices for storing data, such as a hard disk drive (HDD), a magnetic tape drive, a solid-state drive (SSD), a storage area network (SAN) storage device, or a networked attached storage (NAS) device. In some cases, a data center, such as datacenter 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160 (e.g., in some cases, a server may act as an application server or a file server). In general, a server may refer to a hardware device that acts as the host in a client-server relationship or a software process that shares a resource with or performs work for one or more clients.

One embodiment of server 160 includes a network interface 165, processor 166, memory 167, disk 168, virtualization manager 169, and a lightweight deduplication system 171 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-Mate drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance (e.g., agent installed on the storage appliance), such as storage appliance 140 or storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual machine may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at a point in time is frozen) to a storage appliance in response to a request made by the storage appliance. After the data associated with the point-in-time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual-machine-related tasks, such as cloning virtual machines, creating new virtual machines, monitoring the state of virtual machines, moving virtual machines between physical hosts for load balancing purposes, and facilitating backups of virtual machines.

The lightweight deduplication system 171 is configured to implement efficient deduplication approaches, as discussed in further detail below. Although the lightweight deduplication system 171 is illustrated as operating on the server 160, it is appreciated that the lightweight deduplication system 171 can be integrated and run on other devices of the networked computing environment 100, including, for example, on storage device 140 or storage appliance 170.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 154.

The storage appliance 140 may comprise a cloud-based data management system for backing up virtual machines and/or files within a virtualized infrastructure, such as virtual machines running on server 160 or files stored on server 160 (e.g., locally stored files, files stored in mounted directories), according to some example embodiments.

In some cases, networked computing environment 100 may provide remote access to secure applications and files stored within datacenter 150 from a remote computing device, such as computing device 154. The datacenter 150 may use an access control application to manage remote access to protected resources, such as protected applications, databases, or files located within the datacenter 150. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the datacenter 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. A user (e.g., database administrator) of the storage appliance 170 may then select the particular version to be mounted and run an application (e.g., a data analytics application) using the mounted version of the virtual machine. In another example, the particular version may be mounted as an iSCSI target.

In some example embodiments, the storage appliance 140 is an external network connected database appliance comprising an agent 142, an application 144, and a storage device 146. In some example embodiments, the application 144 is a database application for managing a database (e.g., Oracle database management system) that can store database data locally on storage device 146, or on remote storage locations, such as within datacenter 150. The agent 142 is a remote connection system for performing snapshots of database data (e.g., databases managed by application 144), and can further implement bootstrapping, upgrade, and further include backup features to transfer data from the storage appliance 140 to datacenter 150 via networks 180.

In some example embodiments, the agent 142 can be uploaded from the datacenter 150 and installed on the storage appliance 140. After installation on storage application 140, the agent 142 can be enabled or disabled by the storage appliance 140 over time. The agent 142 may acquire one or more electronic files or snapshot information associated with the one or more electronic files from the application 144. The snapshot information may include full and/or differential snapshot data. In one example, the one or more electronic files may comprise a database file for a database and the snapshot information may comprise a differential backup of the database file.

In those embodiments in which the application 144 is a database application that manages a database, the agent 142 is configured to acquire one or more electronic files corresponding with a first point-in-time version of the database from the database application. The agent 142 can further acquire a database file for the database from the application 144 or acquire a full or differential backup of the database from the computing application 144. The determination of whether the agent 142 acquires the database file or the full or differential backup may depend on a file size of the database file. The database file may comprise a text file or a binary file. The agent 142 may transfer one or more changed data blocks corresponding with the first point-in-time version of the database to the storage appliance 140. The one or more changed data blocks may be identified by the agent 142 by generating and comparing fingerprints or signatures for data blocks of the database file with previously generated fingerprints or signatures associated with earlier point-in-time versions of the database file captured prior to the first point in time. In some example embodiments, the agent 142 can perform automatic upgrades or downgrades to be in-sync with software changes to a plurality of nodes (e.g., nodes operating within storage appliance 170).

In some example embodiments, the agent 142 is further configured to interface with application 144 or storage device 146 to implement changes, such as creating directories, database instances, reads/writes, and other operations to provide database management functions between the storage appliance 140 and devices within datacenter 150. For example, the application 144 can be a relational database management application with plugin functionality, in which third-party developed plugins or extensions can be integrated in the application 144 to perform actions, such as creation of a database instance.

Figure 1B:
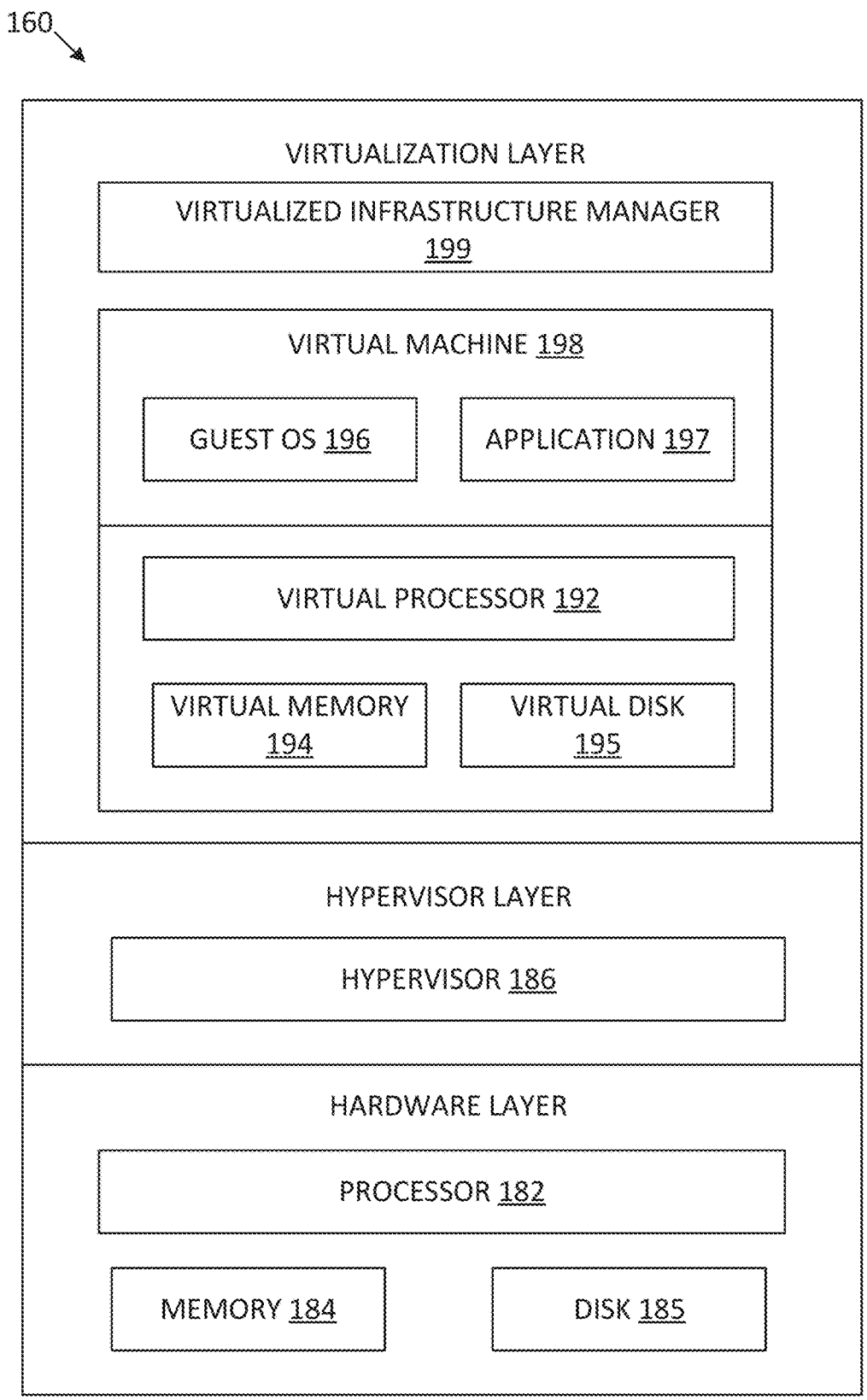
FIG. 1B depicts a server of a networked computing environment, according to some example embodiments.

FIG. 1B depicts one embodiment of the server 160 of FIG. 1A. The server 160 may comprise one server out of a plurality of servers that are networked together within a datacenter e.g., the datacenter 150). In one example, the plurality of servers may be positioned within one or more server racks within the datacenter 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure-related tasks, such as cloning virtual machines, creating new virtual machines (e.g., new virtual machines for new nodes of the cluster), monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server 160. The distributed file system protocol may allow the server 160 or the hypervisor 186 to mount a directory or a portion of a file system located within the storage appliance 140. For example, the storage appliance 140 can include a standalone host of a database, where the server 160 mounts the database directories as if the files were locally stored on server 160. Further, the server 160 may function as a backup device for storage appliance 140 by backing up data in the mounted directories in a distributed database within datacenter 150, such as a cluster of nodes in storage appliance 170.

Figure 1C:
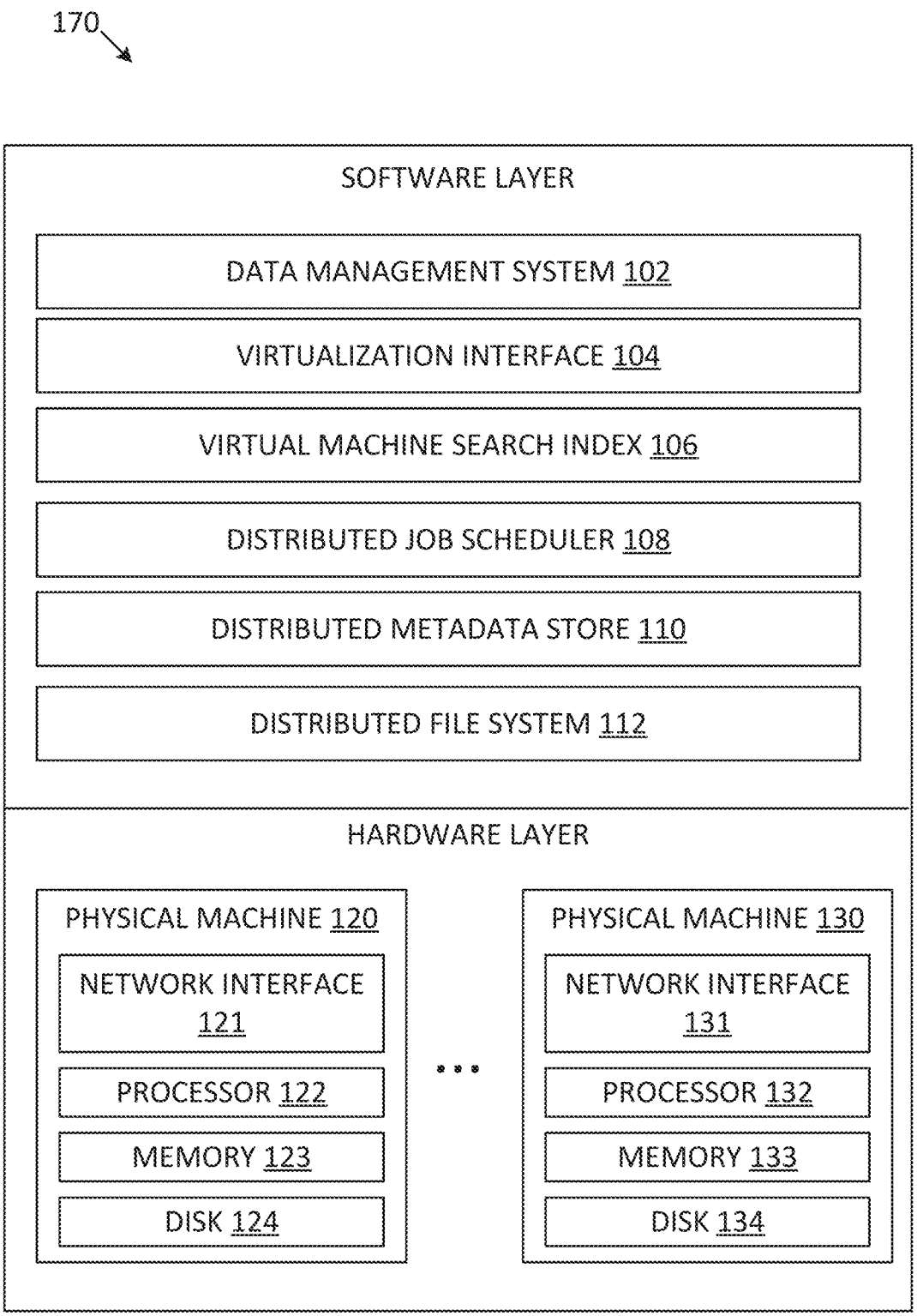
FIG. 1C depicts a storage appliance of a networked computing environment, according to some example embodiments.

FIG. 1C depicts one embodiment of storage appliance 170 in FIG. 1A. The storage appliance 170 may include a plurality of physical machines that may be grouped together and presented as a single computing system. Each physical machine of the plurality of physical machines may comprise a node in a cluster (e.g., a failover cluster, a Cassandra cluster). In one example, the storage appliance 170 may be positioned within a server rack within a datacenter. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer-readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., four machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B, may be configured with a first floating IP address associated with a first node in the cluster. The hypervisor 186 may connect to the cluster using the first floating IP address. In one example, the hypervisor 186 may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used b hypervisor 186 for communicating with the cluster.

In order to determine which of the other nodes in the cluster will assume the first floating IP address, a VRRP priority may be established. In one example, given a number (N) of nodes in a cluster from node (0) to node (N-1), for a floating IP address (i), the VRRP priority of nodeG) may be G-i) modulo N. In another example, given a number (N) of nodes in a cluster from node (0) to node (N-1), for a floating IP address (i), the VRRP priority of nodeG) may be (i-j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-shots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system 112 for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault-tolerant distributed file system 112. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored, and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault-tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes), The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager 199 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption-related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks, and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance (e.g., storage appliance 170) that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
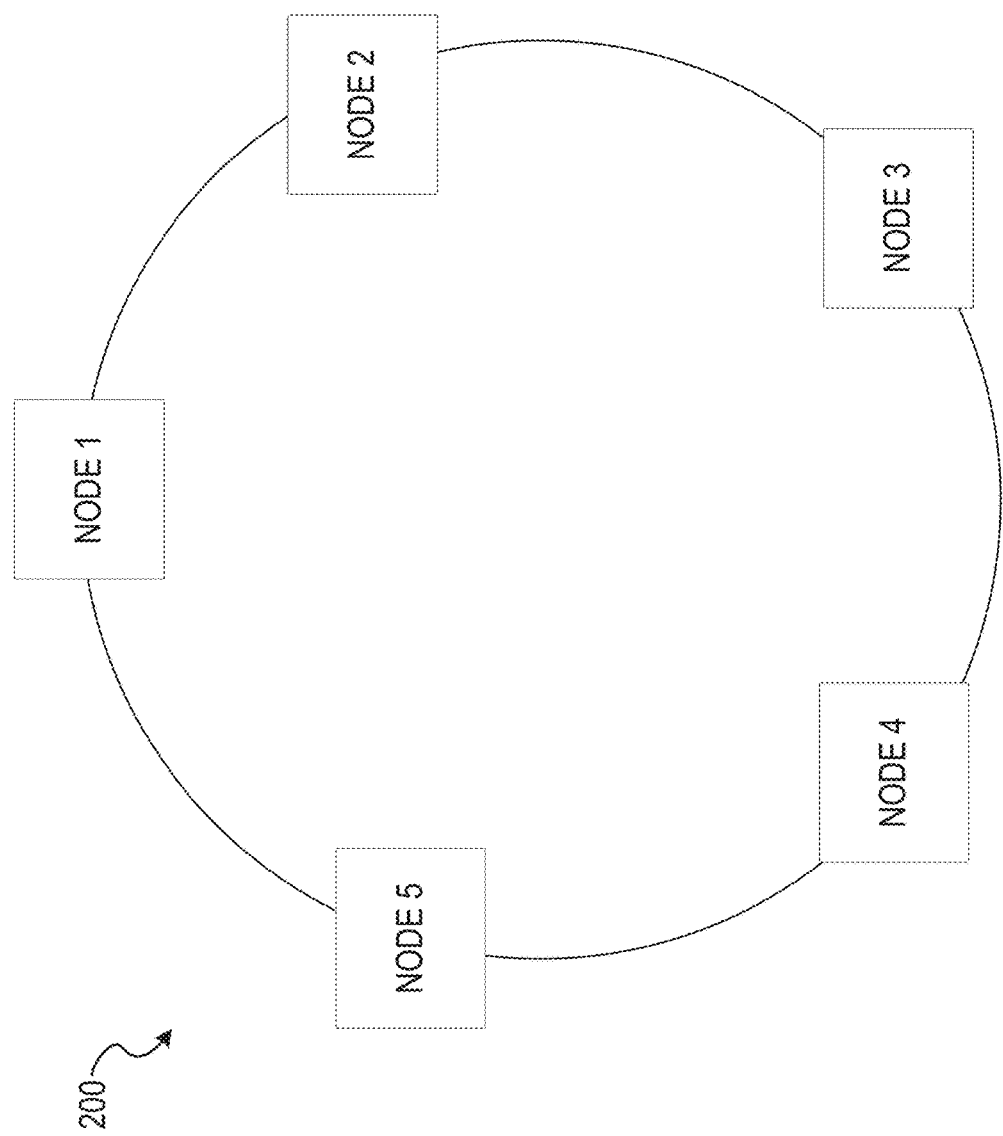
FIG. 2 shows an example cluster of a distributed decentralized database, according to some example embodiments.

FIG. 2 shows an example cluster 200 of a distributed decentralized database, according to some example embodiments. As illustrated, the example cluster 200 includes five nodes, nodes 1-5. In some example embodiments, each of the five nodes runs from different machines, such as physical machine 120 in FIG. 1C or virtual machine 198 in FIG. 1B. The nodes in the cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the cluster 200 in shards or chunks, and decentralized in that there is no central storage device and therefore no single point of failure. The system operates under an assumption that multiple nodes may go down, up, or become non-responsive, and so on. Sharding is splitting up of the data horizontally and managing each separately on different nodes. For example, if the data managed by the cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the cluster 200. For example, data written to node 1 can be replicated to nodes 2 and 3. If node 1 prematurely terminates, node 2 and/or 3 can be used to provide the replicated data. In some example embodiments, each node of cluster 200 frequently exchanges state information about itself and other nodes across the cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the cluster 200.

Reading: Any node of cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of cluster 200 are configured to function the same way (e.g., as symmetrical peer database nodes that communicate via gossip protocol, such as Cassandra nodes) with no single point of failure. If one of the nodes in cluster 200 terminates prematurely ("goes down"), another node can rapidly take the place of the terminated node without disrupting service. The cluster 200 can be a container for a keyspace, which is a container for data in the distributed decentralized database system (e.g., whereas a database is a container for containers in conventional relational databases, the Cassandra keyspace is a container for a Cassandra database system).

Figure 3:
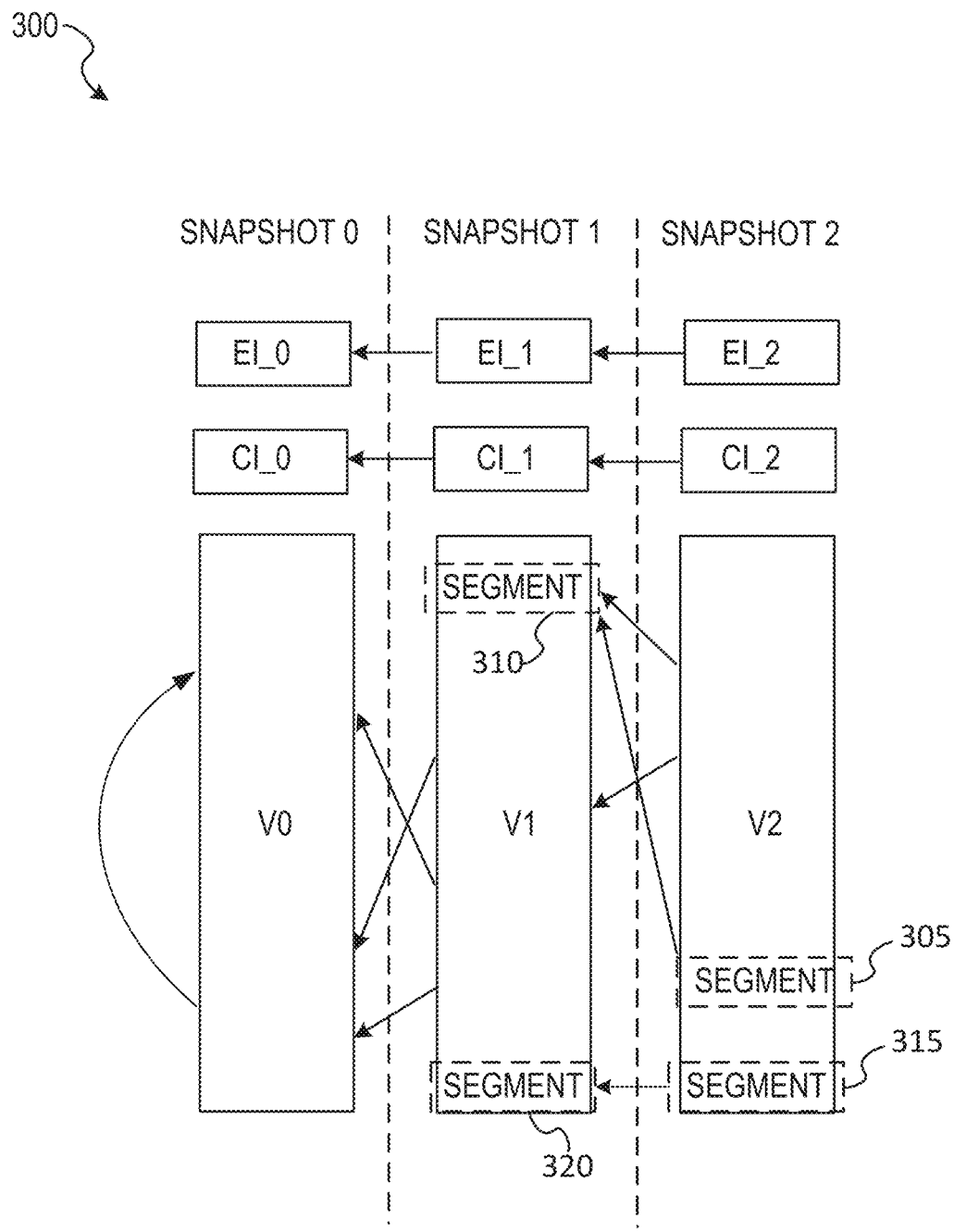
FIG. 3 shows an example data structure for deduplicating data using the lightweight deduplication system, according to some example embodiments.

FIG. 3 shows an example data structure 300 for deduplicating data using the lightweight deduplication system 171, according to some example embodiments. As discussed, online deduplication of large data can be problematic for some devices, such as hardware-limited devices (e.g., small amount of flash, much smaller memory and no NVRAM). To this end, the lightweight deduplication system 171 can be implemented to deduplicate a large file against one or more other large files (e.g., petabyte-size snapshots) in a high-performance approach that functions well on resource-limited devices. In the example of FIG. 3, the snapshot volumes V0, V1, and V2 consist of sequential data (e.g., sequentially in the order of tens of megabytes); however, it is appreciated that the approaches of lightweight deduplication system 171 can be integrated for other systems, and parameters, such as the caching parameters, can be adjusted for different structures of data (e.g., partially sequential data, non-sequential randomly stored and accessed data, etc.). Each of the volumes V0, V1, and V2 in the example structure 300 comprises data which is partitioned into a plurality of sequential segments that are in the same sequential order (e.g., volume V0 has a first segment that is aligned with a first segment of volume V1, which is further aligned with a first segment of volume V2, and so on for a plurality of n segments).

In the example structure 300, volume V2 is to be deduped against volume V1, although in some embodiments volume V2 is deduped against a plurality of volumes, e.g., V1, V0, or other volumes that are not chained (e.g., an external volume of a different snapshot or dataset). In the illustrated example, each volume is persisted with two indices—the extent index (EI) and the content index (CI). On writing, volume V1 is segmented into fixed size or variable size (32-64K) segments, and for each segment the lightweight deduplication system 171 adds an entry into the extent index EI_1 of volume V1 and the content index CI_1 of volume 1.

The Extent Index for a volume is a file with a map of segment offsets to the full fingerprints of each segment (e.g., full 20 byte SHA1 hash), where the record of where each fingerprint is for a given segment is tracked by an offset. For example, a given segment may be located at the 315th offset within a given volume, and in the extent index the 315th offset is the key that maps to a corresponding full fingerprint of that segment. In some example embodiments, the extent index is configured as a two-level key-value store in which the key is an 8 byte offset to the value that is the 20 byte fingerprint of a given segment. Because each full SHA1 hash is unique for each segment, the extent index functions as a source of truth to determine whether two potential candidate segments are indeed identical and can be deduped. For example, if the fingerprint of the segment 305 in the volume V2 matches the fingerprint of the segment 310 in the volume V1, then the segment 305 is replaced with a reference address or pointer to the location of segment 310 in the volume V1 to avoid writing duplicates in the structure 300.

The content index is a mapping of a given volume that is optimized for space and performance and is not relied upon as a source of truth by the lightweight deduplication system 171. In some example embodiments, for each segment the content index records only the first 8 bytes of the segment's full fingerprint (e.g., whereas the extent index for a segment has a full 20 byte SHA1 hash, the extent index for that segment stores only the first 8 bytes of the full 20 byte SHA1 hash). Further, and in accordance with some example embodiments, the content index is also a two-value key store; however, in the content index the key is the first 8 bytes of the fingerprint for the given segment, and the value is the offset of the segment. In some example embodiments the keys of the content index are searched to quickly identify the offset of candidate segments for deduplication. For instance, the shortened fingerprint may match a key in the content index, and the corresponding offset is identified in the content index and then used as a key in the extent index to verify the full fingerprints, which are then used to determine whether segments are identical. While the shortened hashes of the content index are not as secure and may have collisions, the lightweight deduplication system 171 can alternate between the content index and the extent index to rapidly perform deduplication in an efficient, accurate, and secure way.

For example, and in accordance with some example embodiments, for a given segment the lightweight deduplication system 171 first checks for an aligned deduplication by determining whether a given segment in volume V2 at a given offset and another segment in volume V1 at the same offset have identical full fingerprints. If they do, the segment in volume V2 is deduped, as illustrated by the aligned and deduped segments 315 and 320.

On the other hand, if the full fingerprints of the aligned segments do not match, the lightweight deduplication system 171 then checks whether the segment matches any other non-aligned segments that are at other offsets in the volume V1 by performing a content index lookup for the content index value (e.g., in the keys of the content index, which are shortened hashes), to search for any potential content index values of the other segments in volume V1. If any content index values match in volume V1, then the extent index is still checked to confirm that the two segments are indeed identical and should be deduped (e.g., deduped in volume V2).

The following is example structural code for alternating between the extent and content indices for aligned and non-aligned lookups.

```
::::::::CODE BEGIN::::::::
Write(offset, data, base_extent_index, base_content_index)
    hash = SHA1(data);
    if (base_extent_index.Lookup(offset) == hash)
        // Aligned Deduplication
        return;
        // Let's see if we can get non-aligned dedup
    base_offset = base_content_index.Lookup(Hash);
    if (base_offset.exists( ))
                // Check with extent index, as a source of truth
                if (base_extent_index.Lookup(base_offset.get( )) ==
                hash)
                    // We have a dedup!
                    WriteReference(ref)
                // No dedup
        WriteData(data)
::::::::CODE END::::::::
```

Figure 4:
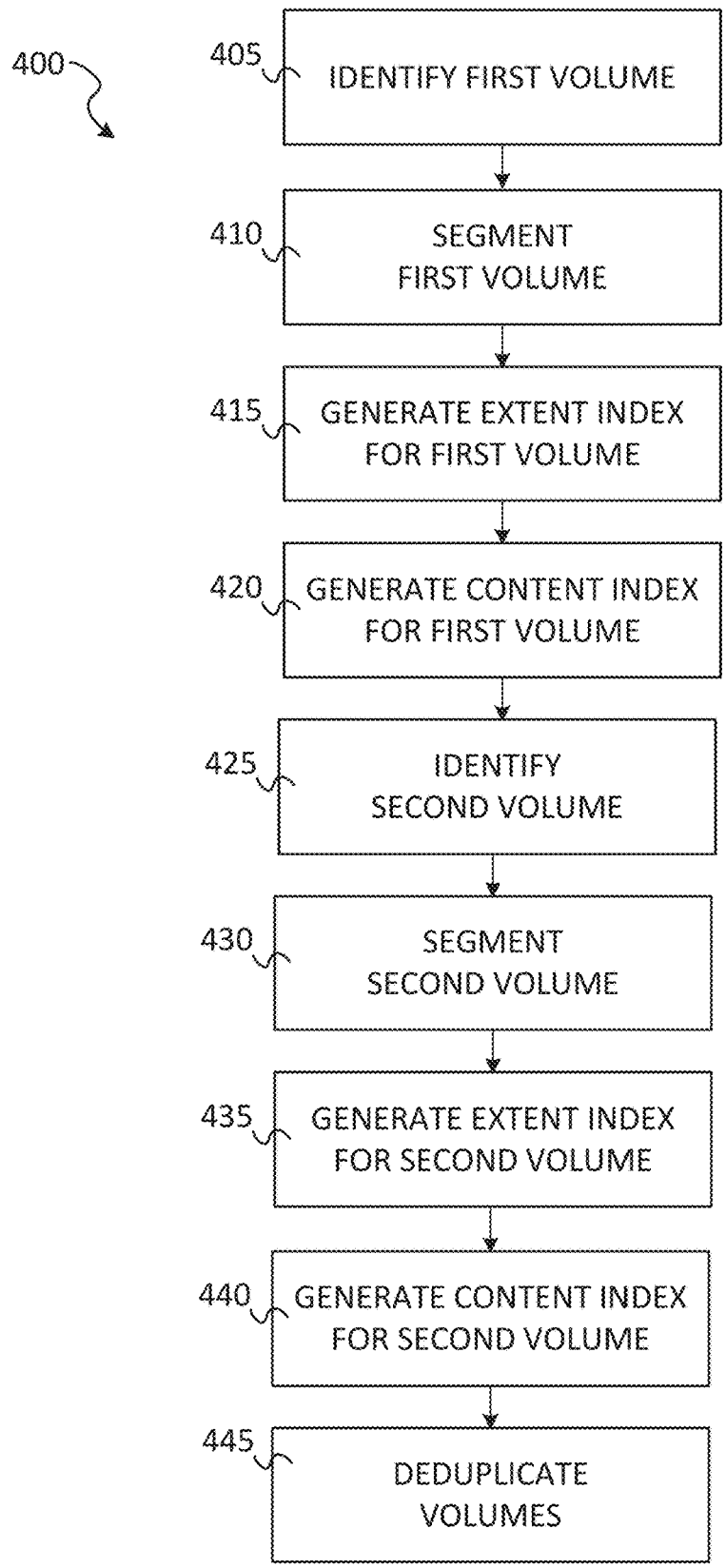
FIG. 4 shows a flow diagram of a method for lightweight deduplication using extent and content index data operations, according to some example embodiments.

FIG. 4 shows a flow diagram of a method 400 for lightweight deduplication using extent and content index data operations, according to some example embodiments. At operation 405, the lightweight deduplication system 171 identifies a first volume. For example, the lightweight deduplication system 171 identifies a first snapshot of data to be stored and later deduplicated snapshots (e.g., a second volume or snapshot).

At operation 410, the lightweight deduplication system 171 segments the first volume. For example, at operation 410 the lightweight deduplication system 171 partitions the first volume into segments of 64 kilobytes.

At operation 415, the lightweight deduplication system 171 generates an extent index for the first volume. For example, the lightweight deduplication system 171 generates a SHA1 hash for each of the segments to function as fingerprints for the hashes, and stores the segment hashes as values in a two-key value store where the segment's offset within the first volume is the key for a corresponding value comprising a given hash of a segment.

At operation 420, the lightweight deduplication system 171 generates a content index for the first volume. For example, the lightweight deduplication system 171 shortens the full hash of each segment and stores the shortened hash as a key in a two-value key store, where the shortened hash is the key which maps to the value that is the segment's offset in the first volume.

At operation 425, the lightweight deduplication system 171 identifies a second volume. For example, after the first volume is stored, a second volume is received for deduplication against the first volume, where the first volume is an initial snapshot of a dataset and the second volume is a second, later snapshot of the same dataset (e.g., a virtual machine managed by the system 100).

At operation 430, the lightweight deduplication system 171 segments the second volume. For example, at operation 430 the lightweight deduplication system 171 partitions the second volume into segments of 64 kilobytes.

At operation 435, the lightweight deduplication system 171 generates an extent index for the second volume. For example, the lightweight deduplication system 171 generates a SHA1 hash for each of the segments in the second volume, and stores the segment hashes as values in a two-key value store where the segment's offset within the second volume is the key for a corresponding value comprising a given hash of a segment of the second volume.

At operation 440, the lightweight deduplication system 171 generates a content index for the second volume. For example, the lightweight deduplication system 171 shortens the full hash of each segment in the second volume and stores the shortened hash as a key in two-value key store, where the shortened hash is the key which maps to the value that is the segment's offset in the second volume.

At operation 445, the lightweight deduplication system 171 deduplicates the first and second volumes using the generated content and extent indices. For example, at operation 445 lightweight deduplication system 171 implements alternating extent and content index lookups to find duplicate data items shared by the first and second volumes. Additionally, and in accordance with some example embodiments, lightweight deduplication system 171 implements alternative deduplication approaches at operation 445, such as using a content index cache and/or hit counters for the volumes, where the volumes are part of a snapshot chain of a single dataset (e.g., virtual machine image).

Figure 5:
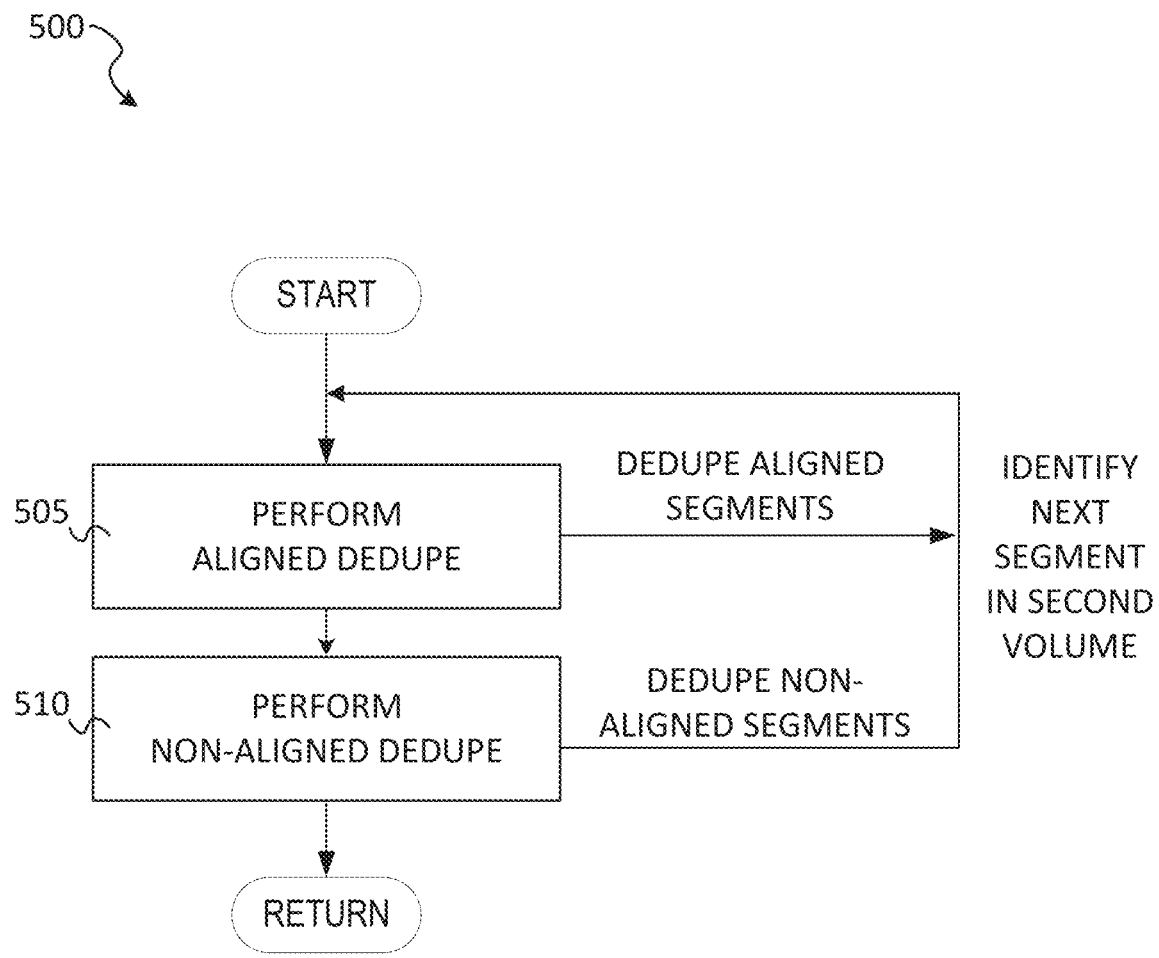
FIG. 5 shows a flow diagram of a method for deduplicating data using aligned and non-aligned deduplication, according to some example embodiments.

FIG. 5 shows a flow diagram of a method 500 for deduplicating data using aligned and non-aligned deduplication, according to some example embodiments.

The method 500 is an example implementation of operation 445 in which the first and second volumes are deduplicated using the extent index and content index data of the volumes, according to some example embodiments.

At operation 505, the lightweight deduplication system 171 performs deduplication of a segment in the second volume against an aligned segment in the first volume. For example, at operation 505 the lightweight deduplication system 171 identifies the offset of a segment in the second volume (e.g., segment 315), then identifies a corresponding segment in the first volume that is located at the same offset (e.g., segment 320), and then determines whether the hashes are identical by determining whether their corresponding full fingerprints are identical. If the segments are identical according to their matching full fingerprints, then a reference is added to the second volume segment pointing to the duplicate segment in the first volume, thereby avoiding duplication of data in the data storage platform. Assuming the segments do not have identical full fingerprints and are therefore not duplicates, the method 500 proceeds to operation 510.

At operation 510, the lightweight deduplication system 171 performs non-aligned deduplication of the segment in the second volume against one or more non-aligned segments of the first volume. For example, once the segment in the second volume is determined to not be identical with its aligned counterpart in the first volume, the lightweight deduplication system 171 performs a lookup in the first content index of the first volume to determine whether any of the shortened hashes match the shortened hash of the segment in the second volume. If none of the shortened hashes of the first volume match the shortened hash of the segment in the second volume, the segment in the second volume is not a duplicate and is stored as part of the second volume. On the other hand, if any of the shortened hashes of the first content index of the first volume match the shortened hash of the segment in the second volume, then the lightweight deduplication system 171 confirms they are identical by using the full fingerprints of the respective volumes. For instance, if a shortened hash in the content index of the first volume matches, then the shortened hash (which is a key in the content index) is used to identify the value which is the offset of the segment, which is then used as the key in the extent index to identify the full fingerprint of the segment in the first volume, followed by confirming that the full fingerprints of the segments in the respective volumes are indeed identical and should be deduplicated (e.g., by adding a reference or point from the segment of the second volume to the segment of the first volume).

Figure 6:
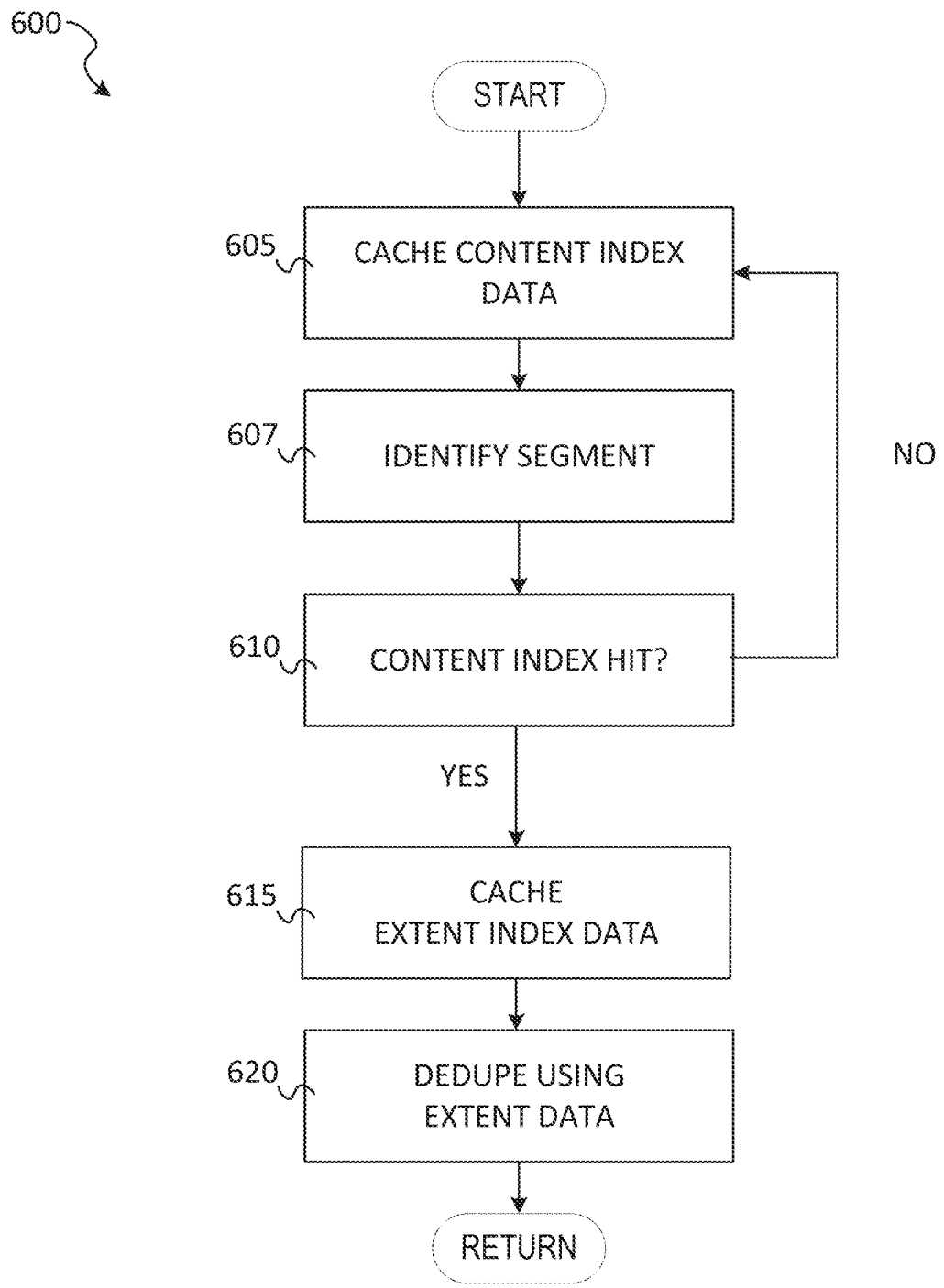
FIG. 6 shows a flow diagram of a method for implementing the lightweight deduplication system using cached index data, according to some example embodiments.

FIG. 6 shows a flow diagram of a flow diagram of a method 600 for implementing the lightweight deduplication system 171 using cached index data, according to some example embodiments. In some data architectures, the searching of potential candidate shortened fingerprint matches can be slow and non-efficient. For example, if the volumes comprise random data (e.g., non-sequential), the searching for potential matching segments using random reads in a lookup process may not necessarily increase the deduplication speed. To this end, the lightweight deduplication system 171 can implement method 600, which is an example configuration of operation 445 in which the first and second volumes are deduplicated using the extent and content indexes of the volume, according to some example embodiments. At a high level, the method 600 implements the caching of the content index, only looking up for a content index match once the cache is full (e.g., every 8 MB); if the cached content index data is a hit (e.g., matching shortened fingerprints between the two volumes), then the next 32 MB of the extent index data is cached and checks for duplicate data items are performed using full fingerprints, according to some example embodiments.

Continuing, at operation 605, the lightweight deduplication system 171 caches the content index data of the first, second, and/or additional volumes in high performance memory (e.g., flash, onboard memory such as RAM of the server 160). At operation 607, the lightweight deduplication system 171 identifies a segment for content index lookup. For example, the segment located at or around every 8 MB of data within the second volume is identified at operation 607.

At operation 610, the lightweight deduplication system 171 determines whether the identified segment and an aligned segment of the first volume have the same shortened fingerprint. If they do not have the same shortened fingerprints, then the segment is not a duplicate and the method 600 loops to 605 at which the next segment is located (e.g., another segment 8 MB away from the previously checked segment of the second volume), and so on for the segment located at the 8 MB position.

On the other hand, if the segment located at 8 MB does have a shortened fingerprint that matches the shortened fingerprint of an aligned segment in the first volume, then the next 32 MB of the extent index data of both volumes is loaded into the cache (e.g., flash, local memory) for analysis. Because the shortened fingerprint of the two segments at or around the 8 MB offset of the respective volumes match, the lightweight deduplication system 171 assumes that it is a full match and optimistically caches the next 32 MB of full print data of the segments under the assumption that the 32 MB of full printers of the respective volumes will be identical and thus can be duplicated. For example, at operation 615, the lightweight deduplication system 171 loads the next 32 MB from the first extent index of the first volume and the same next 32 MB of full fingerprints from the second extent index of the second volume, and checks, at operation 620, whether the segments located at the same offsets have identical full fingerprints. In some example embodiments, the next 32 MB means the next 32 MB of extent index data having offsets after the segment at the 8 MB mark that was checked using the content index data.

Figure 7:
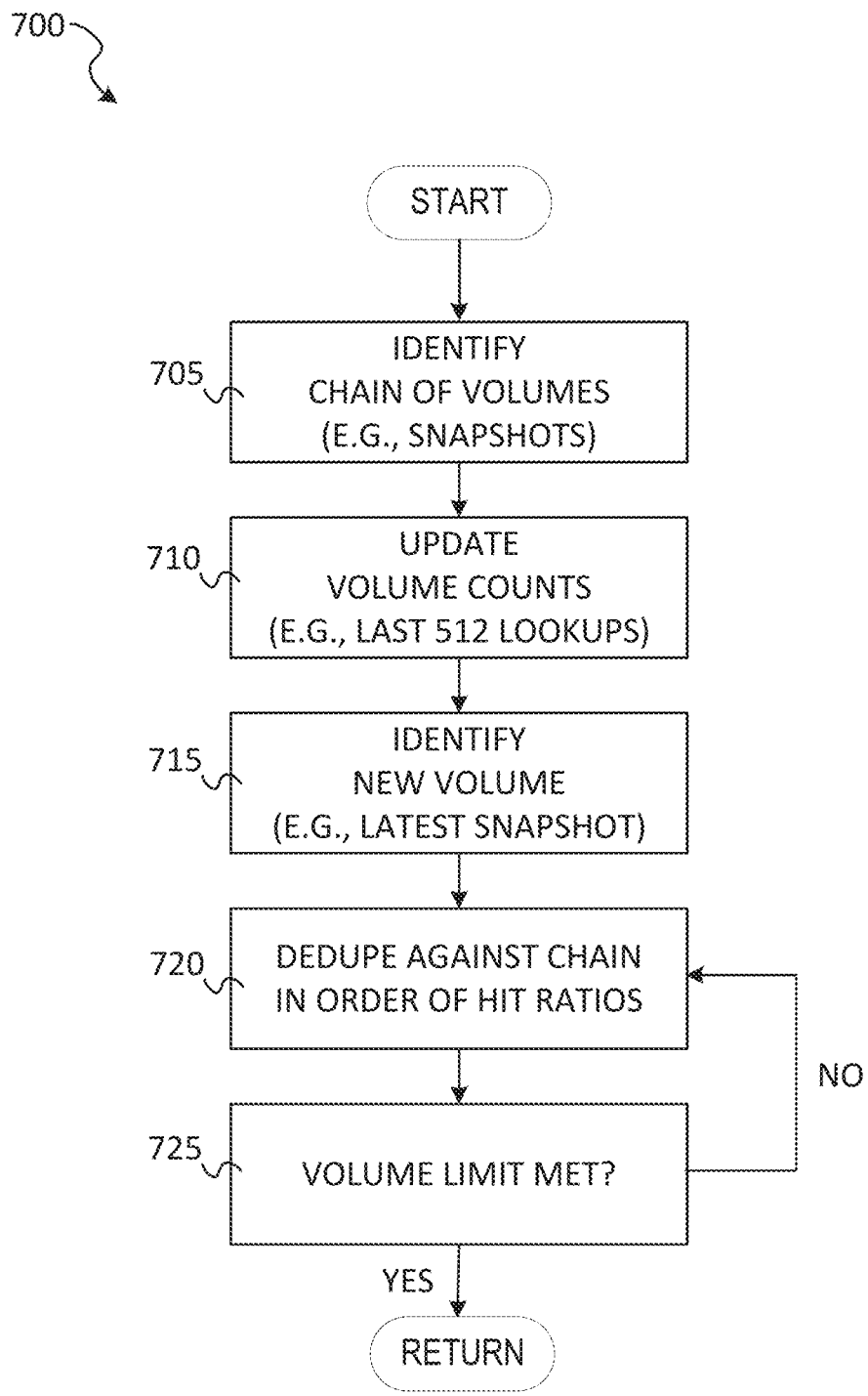
FIG. 7 shows a flow diagram of a method for implementing lightweight duplication using index limits, according to some example embodiments.

FIG. 7 shows a flow diagram of a method 700 for implementing lightweight deduplication of chained datasets, according to some example embodiments. In implementations where the data of the new volume is to be deduplicated against a long set of chained volumes (e.g., snapshots), then performing a random lookup over the content indices of the long chain of volumes will result in low performance. For example, if the dataset is a virtual machine image, and each volume is a snapshot at a given time (volume 1 at a first time, volume 2 at a later time, and so on), then deduping the latest snapshot against a long chain of previous snapshots may result in low performance because each previous snapshot may need to be analyzed against the new volume to identify and deduplicate data items shared by the new volume and the existing snapshots. To this end, and in accordance with some example embodiments, the lightweight deduplication system 171 is configured to only look up to a limit of seven past content indices based on a heuristic approach using hit counters. The lightweight deduplication system 171 implements this content index lookup limit to avoid consulting each of the past volumes in the chain for possible deduplication.

The lightweight deduplication system 171 can rely on the content index lookup limit being enough to deduplicate newly received volumes/snapshots since which content indexes are looked up and included in the seven is preconfigured using hit counters. That is, and in accordance with some example embodiments: for each volume in the chain, the system 171 maintains a rolling in-memory bitmap of the hit list of the last 512 lookups: "0" if it was a miss and "1" if it was a hit. For each volume, the system 171 keeps track of the hit ratio for each volume based on the last 512 lookups. Then when a new volume (e.g., latest snapshot) is to be deduplicated against the long chain, the system 171 deduplicates the new volume down the chain, but in order of hit ratio. In this way, due to the volumes being chained and snapshots of the same dataset, the highest ranked volume likely has few differences (as it had so many previous cache hits from other dedupes as tracked by the 512 counter), and thus will likely be a good candidate that is very similar to the newly received snapshot. In some example embodiments, if the hit ratio is the same for multiple volumes (e.g., no data changes made to the virtual machine, thus multiple snapshots at different times may have similar or the same hit counters), then the system 171 is configured to choose one of the volumes randomly followed by selecting another volume having the same hit ratio at random, until no more volumes having the same hit ratio are left or until the content index lookup limit is reached (e.g., seven). The rationale of the system 171 being configured with the hit ratio and limits of FIG. 7 is that a given volume that has a lot of hits most likely has high hits because it was a recent snapshot and would have highly overlapped data (e.g., only the deltas would not align). In this way, the system 171 can implement a deduplication approach that has a very good deduplication hit ratio while maintaining a low lookup cost.

At operation 705, the lightweight deduplication system 171 identifies a chain of volumes, such as a chain of snapshots of the same dataset, e.g., a virtual machine image.

At operation 710, the lightweight deduplication system 171 updates the counts of the hit counters. For example, the system 171 tracks the last 512 content index lookup hits for each volume in the chain.

At operation 715, the lightweight deduplication system 171 identifies a new volume for deduplication against the chain of volumes. For example, a new snapshot of the virtual machine image is identified at operation 715.

At operation 720, the lightweight deduplication system 171 duplicates the new volume against the highest-ranking volume from the chain of volumes (e.g., descending order, greatest to least in order of hit ratios). For example, of the volumes that can be checked for duplicate data items, the volume with the highest hit ratio in its last 512 lookups is first selected for deduplication against the new volume (e.g., followed by selection and deduplication of the volume with the second highest hit volume, and so on).

At operation 725, after duplicating against the last highest-ranking volume, the lightweight deduplication system 171 determines whether the content index lookup limit is met (e.g., seven, a limit to only perform at most seven content index lookups). If the volume limit is met, then no further deduplication is performed and the lightweight deduplication system 171 stores the new volume as sufficiently deduplicated against the chain of volumes. On the other hand, if the volume limit is not met, then the next highest-ranking volume is deduplicated against.

As discussed, and in accordance with some example embodiments, if two or more of the volumes have the same lookup hit count, the lightweight deduplication system 171 selects one of the volumes at random for deduplication, followed by the remaining volumes at random until the volume limit is met.

In some example embodiments, upon selection of a given volume for deduplication in FIG. 7, the actual deduplication processes can be implemented using one or more of the following approaches discussed above. For example, the first volume with the highest hit ratio in the last 512 lookups can be identified and selected, and the new volume is duplicated against the selected volume using the method 500 of alternating extent and content index data lookups, or method 600 of looking up every 8 MB and then caching 32 MB of extent data if there is a hit, as discussed above.

As discussed above, for data replication over a Wide Area Network (WAN), bandwidth utilization is an important constraint and it is often desirable to minimize or at least reduce the amount of data that is required to be transferred over the WAN. In some examples, snapshot data on a cluster (for example, the cluster 200 in FIG. 2) is stored using sparse representations. In addition, some examples store additional supporting files containing fingerprints (SHA1 hash) of data blocks that facilitate deduplication techniques and data integrity checks.

Figure 10:
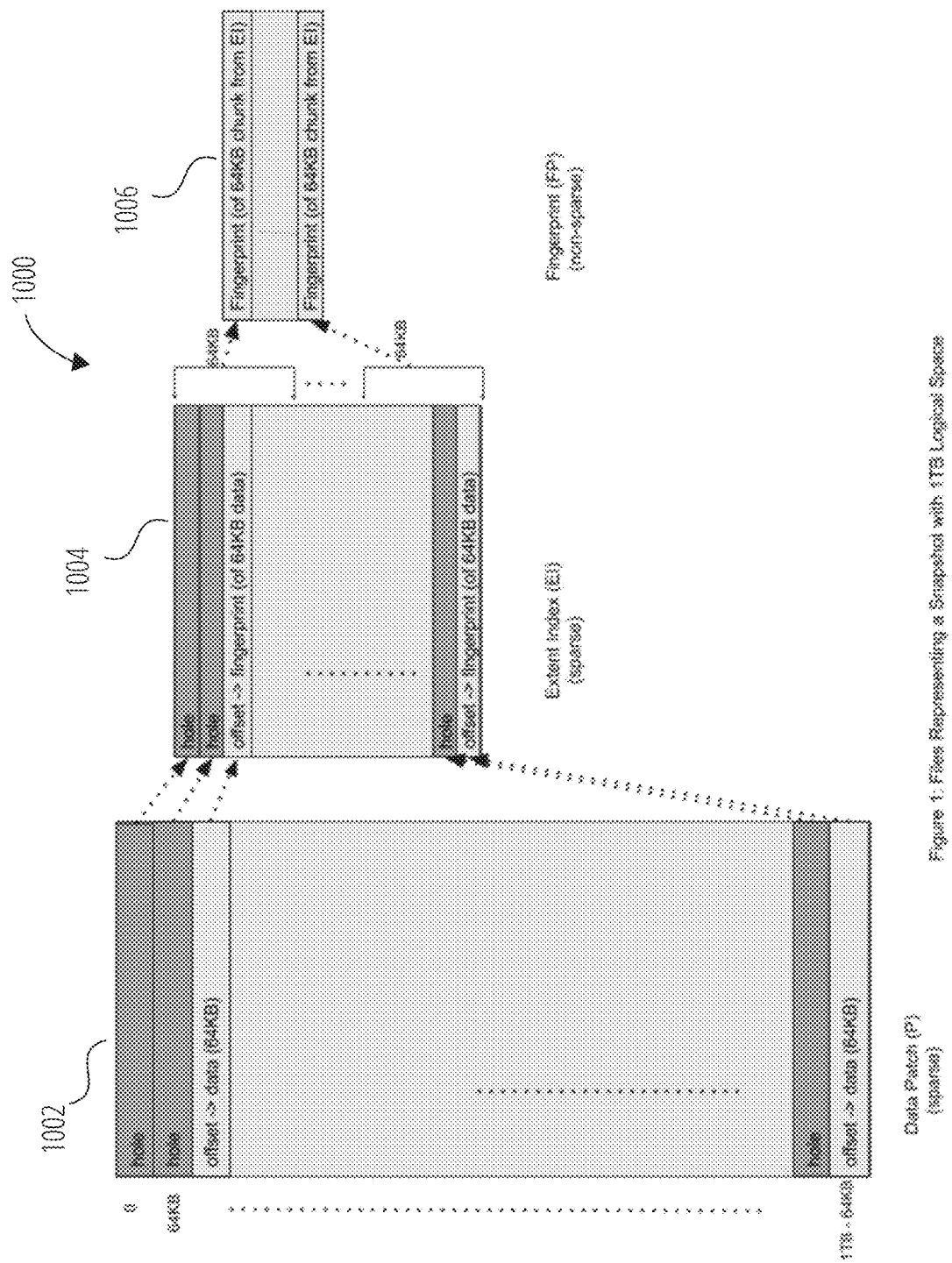
FIG. 10 illustrates a representative hierarchy of sparse and non-sparse data storage for a snapshot, according to an example embodiment.

FIG. 10 illustrates a representative hierarchy 1000 of sparse and non-sparse data storage for a snapshot. Data is represented in terms of a block (say 64 KB). Only blocks that are written in the current snapshot are stored in a data patch file (P) as an offset to data map. For a given patch file P 1002, the example includes an Extent Index (EI) file 1004 that stores an offset to a fingerprint (SHA1 hash value) of each block that is present in the associated patch file P 1002. In some examples, each fingerprint is 20 bytes. The EI file 1004, therefore, is also sparse (like patch file P 1002) and only represents modified blocks for the current snapshot. A "sparse" file is therefore established relative to another file, for example relating only to modifications thereto, as opposed to an absolute ("non-sparse" or "not sparse") value determined without reference to anything else.

Finally, some examples include a fingerprint file (FP) 1006 which stores a fingerprint of each block (say 64 KB) from the EI file 1004. Note that the FP file 1006 is not sparse. That is, it represents the entire logical space, not just the blocks written for the snapshot. If a block is not present in the current snapshot, the entire snapshot chain needs to be read to find out that block so the fingerprint for the FP file 1006 can be computed. Also, note that in one sense the FP file 1006 logically represents a fingerprint of fingerprints: in EI file 1004 we have a fingerprint for a 64 KB data block whereas in FP file 1006 we have a fingerprint of a 64 KB chunk from the EI file 1004 (such a chunk represents 64 KB/20 blocks of logical user data assuming 20 bytes for a fingerprint).

As described further below, in some examples the hierarchy 1000 enables minimization or reduction of data replication and transfer in that the FP file 1006 is very small even for a large logical size (even though it represents the entire logical space for the current snapshot). This functionality can also greatly facilitate data integrity checks (since it works as a checksum) and hierarchical replication (as described further below). As an example, if the logical space is 1 TB and we wrote 64 GB data in the current snapshot, the EI file 1004 will have size 20 MB assuming 20 bytes per fingerprint (20×(64 GB/64 KB)) and the FP file 1006 will have a size of 100 KB (20×((20×(1 TB/64 KB))/64 KB)).

Note that, in this example, we thus have a FP file 1006 of just 100 KB that represents the entire 1 TB data space in a non-sparse manner (i.e., has data for all offsets). The EI file 1004, although sparse (i.e., only has data that has been written in current snapshot), is useful for comparing two snapshots for difference techniques (run "diff") and performing deduplication.

In the section above, we see that certain data on a source cluster can be represented in sparse form. Thus, if we want to replicate a snapshot from one cluster to another with minimal data transfer over the WAN, examples herein can just copy the sparse data (and index) files to a remote or target cluster. A challenge can arise, however, in that in many cases we do not want or need to replicate all snapshots to the remote cluster.

Figure 11:
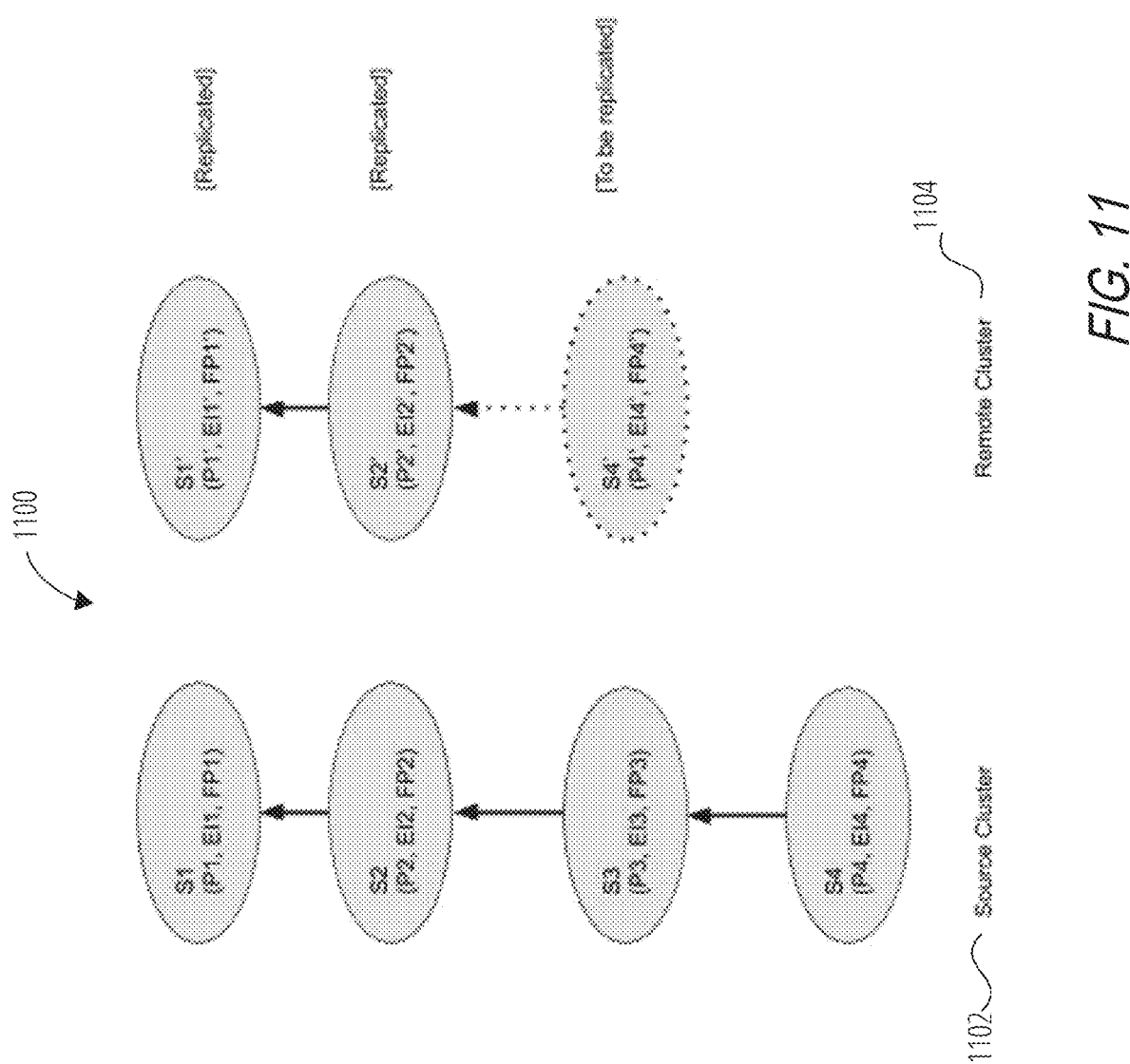
FIG. 11 depicts example operations in an algorithm for hierarchical replication, according to an example embodiment.

With reference to the example scenario 1100 of FIG. 11, say as an example we have 4 snapshots at a source cluster S1→S2→S3→S4 where S2 is an incremental of S1 and so on. Say we have replicated S1 and S2 to a remote (or target) cluster using a copy method (say the replicated snapshots at remote cluster are S1' and S2'). Now, instead of S3, let's say we want to replicate S4 to the remote cluster. This action may be needed for various situations such as: a customer (user) configures their SLA to replicate a subset of snapshots, or by the time the replication of S1 and S2 finishes, S3 has expired locally (i.e., at the host cluster). Viewed another way, the series of snapshots at the source cluster may be said to include at least first (S2), second (S3), and third (S4) snapshots in a consecutive time-based series, and wherein the third snapshot (S4) includes the most recent source snapshot, and wherein the second snapshot (S3) has failed or is otherwise unavailable for replication at the remote cluster.

In such cases, it is not possible just to copy files associated with S4 to the remote cluster since at the remote cluster the snapshot chain should be S1→S2→S4; hence the files at the remote cluster should be relative to S2 rather than S3. We need to synthesize new files representing S4 at the remote cluster, and examples herein enable this action to be taken in a way that results in minimal or reduced data transfer over a WAN.

In order to address this goal, some examples herein perform a hierarchical replication technique as described below. An example algorithm is explained with reference to the example scenario 1100 depicted in FIG. 11. The illustrated scenario 1100 is used simply as an aid in explanation, but the algorithm is generic in nature and may be applied in many other cases.

Given the scenario illustrated in FIG. 11, an objective is to replicate the snapshot S4 from the source cluster 1102 to a remote cluster 1104 with a minimum or reduced data transfer, improved or more efficient deduplication, and performance of a data integrity check. In some examples (such as the present case), the algorithm is executed at the remote (target) cluster 1104, unless it is mentioned explicitly below that a particular step happens at source cluster.

Algorithm steps, in which P represents a patch file, EI represents an Extent Index, CI represents a Content Index, and FP represents a fingerprint file, as discussed above:

Copy FP4 over a WAN from the source (FP4) to the remote cluster (FP4'). Note that FP4' is a complete representation of the logical space for S4 (i.e., FP4' is not sparse), but because of its hierarchical nature it has a very small size compared to the logical space.

Pull EI4' from the source cluster to the remote cluster using the following algorithm (note that EI4' does not necessarily have same content as EI4 although FP4 and FP4' are always the same):

For each (offset→fingerprint) in FP4':
  a. Compare the corresponding fingerprint at the same offset in FP2'.
  b. If the fingerprints are different:
    i. Convert the offset in FP4' into logical offsets in EI using the relationship described with reference to FIG. 10.
    ii. Pull (offset→fingerprint) mappings for all these offsets from the chain (EI1→EI2→EI3→EI4) from the source cluster and write these mappings to EI4'.
  c. If the fingerprints are the same:
    i. Do not do anything (leave holes in EI4').

Generate a CI from the extent indices EI1', EI2" and EI4' at the remote cluster (for example, these are designated CI1', CI2' and CI4'). Note that a CI has a reverse mapping of an EI (that is, a CI has a mapping from fingerprint to offset) and may be used for general deduplication, for example as discussed further above with reference to FIGS. 3-7). In some examples, CIs are generated in the background as soon as EIs are available. Hence, in this case CI1' and CI2' should be already there.

Pull P4' from the source cluster to the remote cluster using the following algorithm (note that P4' does not necessarily have the same content as P4):

For each (offset→fingerprint) in EI4' (since EI4' is sparse, we only traverse the offsets that have been written to in this snapshot; that is, in some examples such as the present, we can skip or jump holes, making this traversal fast):
  a. Compare the fingerprint with the fingerprint at the same offset in the merged version of chain (EI1'→EI2')
  b. If the fingerprints are different (or if there is no fingerprint at that offset in (EI1'→EI2'), i.e. it's a hole):
    i. This means data at the current offset is different in the snapshot to be pulled than in the base (merged version of chain (P1'→P2'))
    ii. Even though the data block is different, we may be able to deduplicate this block against a block at a different offset in current or base snapshot
    iii. To decide whether we can deduplicate, we look up the fingerprint first in the chain (CI1'→CI2') (for deduplication against base) and then in CI4' (for deduplication against self)
    iv. If a match is found:
      1. Deduplication is possible. Hence, instead of pulling the data block from source, just write the deduplication offset (returned by CI lookup) to P4' (this offset is used as a 'reference' to read the data from base or self during a read from this snapshot)
    v. Else:
      1. Deduplication is not possible. Pull the data block at this offset from merged version of the chain (P1→P2→P3→P4) and write the offset→data in P4'
  c. Else:
    i. Do not do anything (leave hole in P4')

It may be appreciated that as the example algorithm is iterated through the above steps, as we generate EI4', we also generate a copy of FP4'. This copy is generated by using the delta found during comparing EIs (as described above) and reading from base patch chain (P1'→P2') or base FP (FP2') to fill holes if needed. Thus, in some examples, this copy of FP4' can be compared to the FP4' copied from the source cluster. These two versions should be identical. This comparison can provide an additional data integrity check that the entire logical space of the replicated snapshot represents the correct point in time.

In some examples, similar systems and methods can be used to upload a snapshot to the cloud (e.g. S3, Azure, Google). Snapshots may be uploaded to the cloud for longer term retention, for example. In some examples, the same logic may be to upload a snapshot to the cloud instead of a remote cluster. Thus, in some examples, the action of "replication" may include or be replaced with the action of "cloud archival". In some examples, the system component including a "remote cluster" (or "target cluster") may include or be replaced with a system component including a "cloud". Also, in some of these alternate examples, data is not "pulled", but "pushed". In some examples, the operations described herein take place on the source cluster, not the remote cluster.

FIGS. 12-14 show operations in methods of replicating a source cluster snapshot at a remote cluster over a WAN, using hierarchical replication, according to some example embodiments.

In FIG. 12, certain operations in a method 1200 for replicating a source cluster snapshot at a remote cluster over a WAN are illustrated. The example method 1200 comprises: at operation 1202, accessing the snapshot at a source cluster; at operation 1204, establishing a replication hierarchy by: at operation 1206, storing, in a sparse patch file (P), only written or modified data blocks in the snapshot, as an offset to a data map; at operation 1208, generating, based on the patch file, a sparse Extent index (EI) file, the Extent index file storing an offset to fingerprint hash or value for each written or modified block present in the patch file; at operation 1210, generating, based on the Extent Index, a non-sparse fingerprint (FP) file representing an entire logical space of the snapshot; at operation 1212, transmitting or pulling at least one or more of the files in the replication hierarchy over the WAN; and, at operation 1214, based on the one or more transmitted or pulled files, replicating the snapshot at the remote cluster.

In FIG. 13, certain operations in a further method 1300 for replicating a source cluster snapshot at a remote cluster over a WAN are illustrated. The example method 1300 comprises: at operation 1302, accessing a series of snapshots at a source cluster; at operation 1304, generating or identifying, for each snapshot at the source cluster, a replication hierarchy, each replication hierarchy including a sparse patch file (P), a sparse Extent Index (EI) file, and a non-sparse fingerprint (FP) file; at operation 1306, for a most recent snapshot in the series of snapshots at the source cluster, copying the non-sparse FP file over the WAN at least to initiate establishment of a most recent snapshot at the remote cluster corresponding to the most recent source snapshot; and, at operation 1308, creating a sparse EI file at the remote cluster for the most recent remote snapshot by pulling the corresponding EI file in the most recent source snapshot, over the WAN, from the source cluster.

In FIG. 14, certain operations in a further method 1400 for replicating a source cluster snapshot at a remote cluster over a WAN are illustrated. The example method 1400 comprises: at operation 1402, accessing a series of snapshots at a source cluster, the series of snapshots at the source cluster including at least first, second, and third snapshots in a consecutive time-based series, and wherein the third snapshot includes a most recent source snapshot, and wherein the second snapshot has failed or is otherwise unavailable for replication at the remote cluster; at operation 1404, generating or identifying, for each snapshot in the series of snapshots at the source cluster, a replication hierarchy, each replication hierarchy including a sparse patch file (P), a sparse Extent Index (EI) file, and a non-sparse fingerprint (FP) file wherein each fingerprint in an FP file includes an offset relative to a data map; at operation 1406, copying the non-sparse FP file from the third, most recent snapshot over the WAN at least to initiate establishment of a most recent remote snapshot at the remote cluster corresponding to the third snapshot; and, at operation 1408, creating a sparse EI file at the remote cluster for the most recent remote snapshot by pulling the corresponding EI file from the third snapshot, over the WAN, from the source cluster.

Some examples include non-transitory machine readable media comprising or embodying instructions which, when read by a machine, because the machine to perform operations in methods for replicating a source cluster snapshot at a remote cluster over a WAN. The methods may include the methods 1200, 1300, and 1400 summarized above or as described elsewhere herein.

As mentioned above, in some examples, the same or similar operations may be used to upload a snapshot to the cloud instead of a remote cluster. Thus, in some examples, the action of "replication" may include or be replaced with the action of "cloud archival". In some examples, the system component including a "remote cluster" (or "target cluster") may include or be replaced with a system component including a "cloud". Also, in some of these alternate examples, data is not "pulled", but "pushed". In some examples, the operations described herein take place on the source cluster, not the remote cluster.

Some examples include methods for deduplicating data inside a chain of snapshots. Data written to the newest snapshot can deduplicate against older snapshots in the chain. Data written to snapshots can also deduplicate internally inside the snapshot (i.e. self-deduplication). In some instances, the amount of data that can be written to one chain is limited due to (1) constraints in the amount of space necessary to process the chain (such as during a reverse/defragmentation) or (2) the need to distribute multiple chains into several nodes in a distributed system for performance and resource management reasons. Thus, in some examples, a method is provided to route data blocks across different chains based on content.

In a system that includes deduplication based on chains, there may be a maximum size a chain can assume. This may generally be true because there is a limit on how much space a system can use when performing reverse (i.e. defragmentation) or consolidation (i.e. general consolidation GC) in the chain. In these cases, the chain may need to be re-written in a different order. Some examples pre-allocate enough capacity in the system so that the chain can be re-written. In some instances, the occurrence of multiple chains being written at the same time can improve performance, especially when these chains are written to different nodes of a distributed system.

In a system in which chains provide deduplication there may be a problem of how to write more data than the maximum allowed by the chain without losing deduplication, and how to write this data efficiently and allow it to also be restored efficiently. More specifically, some examples may seek to be able to expose a block device having a size greater than the maximum block device that can be exported via a single chain.

Figure 15:
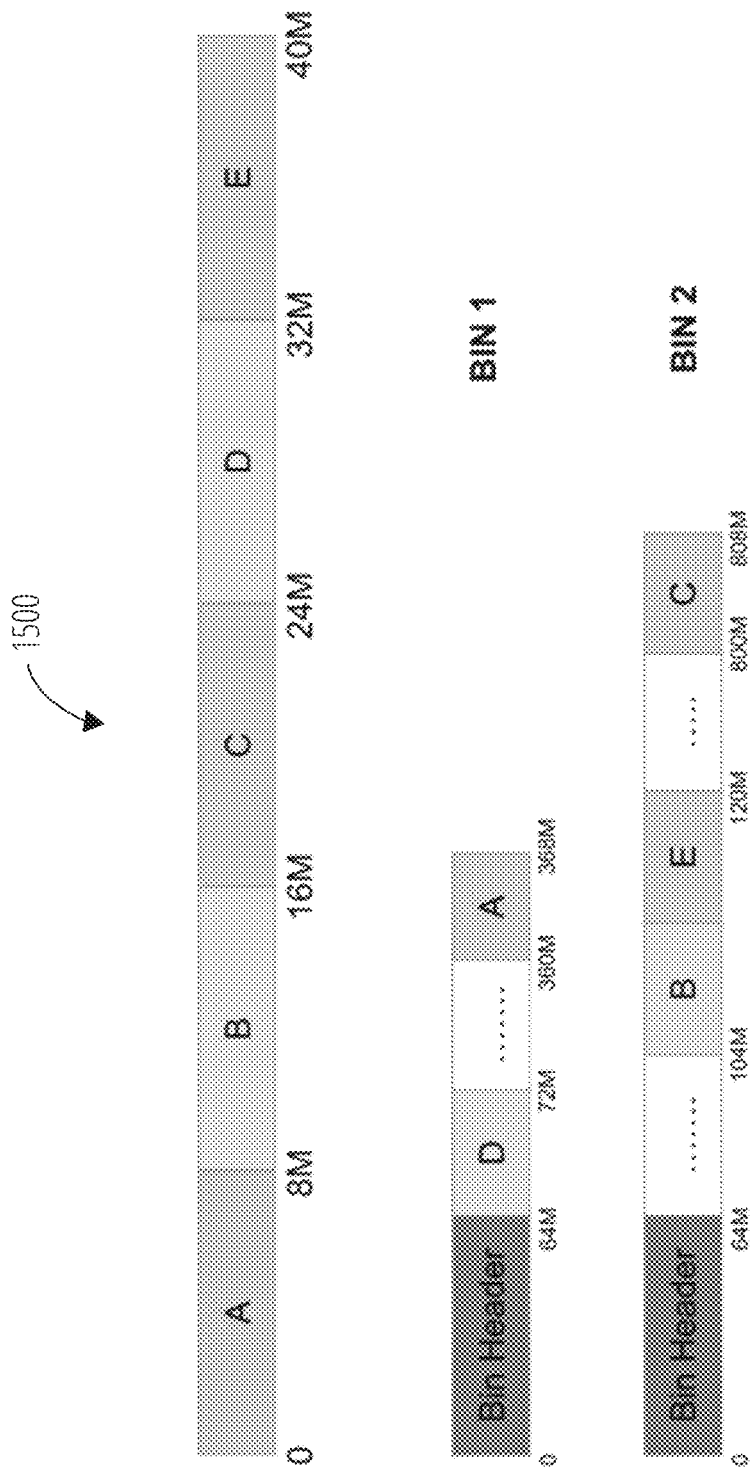
FIG. 15 depicts aspects of content-based routing, according to an example embodiment.

Some examples address this problem by performing data content-based routing to different chains based on content-based features of fixed-sized blocks of data. FIG. 15 depicts aspects of an example. In the view 1500, the image being exposed is split into a sequence of 8 MB fixed sized blocks. These blocks are then routed into different bins. Each bin is itself an image that is backed by a chain of snapshots with block deduplication enabled. Each bin has a bin header and a sequence of blocks which may be referred to as packages.

The package allocation algorithm ensures that packages are allocated sequentially for the data being written around the same time, so that they can also be read sequentially at the same time during reads. The bin header contains metadata necessary to keep track of the block map from logical block device to bins, as well as information on content-based features necessary to do the routing.

Each package contains several segments of data. The segments can be obtained using a fixed-block segmentation algorithm or variable-sized segmentation algorithm. The logical 8 MB blocks are then split into a number of segments.

Figure 16:
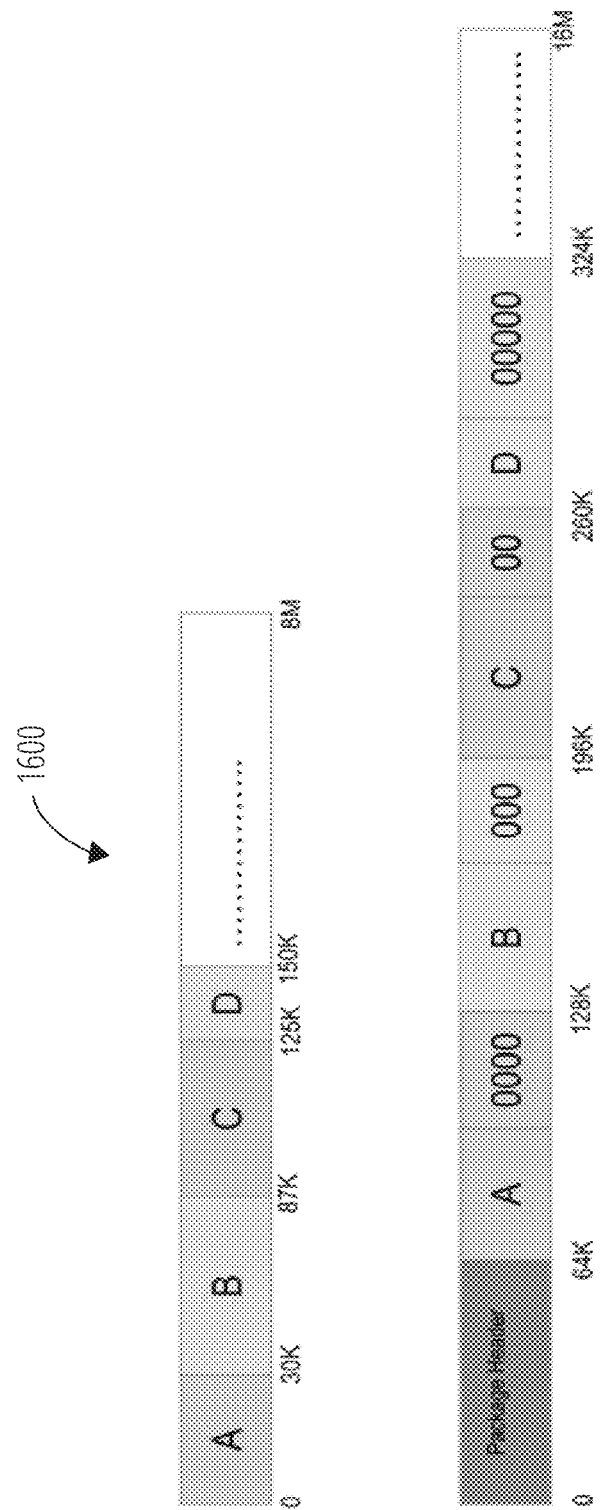
FIG. 16 depicts aspects of variable-sized packaging, according to an example embodiment.

FIG. 16 illustrates aspects of this example which may include variable-sized segment. In the view 1600, the example includes an 8 MB block that is mapped into a package. The package contains a header that maps the segment offsets between the original block and the package. The segments A, B, C and D are obtained via a variable sized segmentation algorithm. The data is the packed into a package in a way that aligns the variable sized segments into fixed-sized blocks, so that the underlying fixed-block-sized deduplication can be effective. Other packing layouts are also possible.

In some examples, routing is based on minhashes. For each 8 MB block, the example hashes all segments obtained by the segmentation algorithm using a cheap hash function. The example computes the N smallest 4-byte hash values for the entire block, which are used to represent the content of the block.

Each bin keeps track of a bloom filter of all the minhashes of all blocks contained inside of it. When the data is first written, the example (1) buffers the entire 8 MB in memory, (2) computes its segments and hash values, (3) obtains the set of smallest hashes (minhashes) and (4) consults all bins to find the bin which has the highest number of matches in its bloom filter. After a bin is chosen, the example stores in an in-memory block map the location of the block in terms of bin number and offset inside the bin. The block minhashes are then added to the chosen bin's bloom filter, and also added to the bin header for persistency and later regeneration.

In some examples, the bloom filter is sized so that it has a very small false positive rate. Also, bloom filters are set representations that do not allow removals, so the example may regenerate them based on the persisted bin header once they start filling up. A separate thread per bin is used to regenerate bloom filters when needed.

Bloom filters and minhashes are probabilistic in nature and it is possible in some examples that they can misroute the data randomly (albeit it a small probability). With a view to avoiding such occurrences, an example may include a concept of "bin pressure". When a stream of data is being routed, the example only changes a bin assignment if there is enough "pressure" in the direction of the new assignment.

The following example algorithm describes an example bin routing at a high level.

Figure 8:
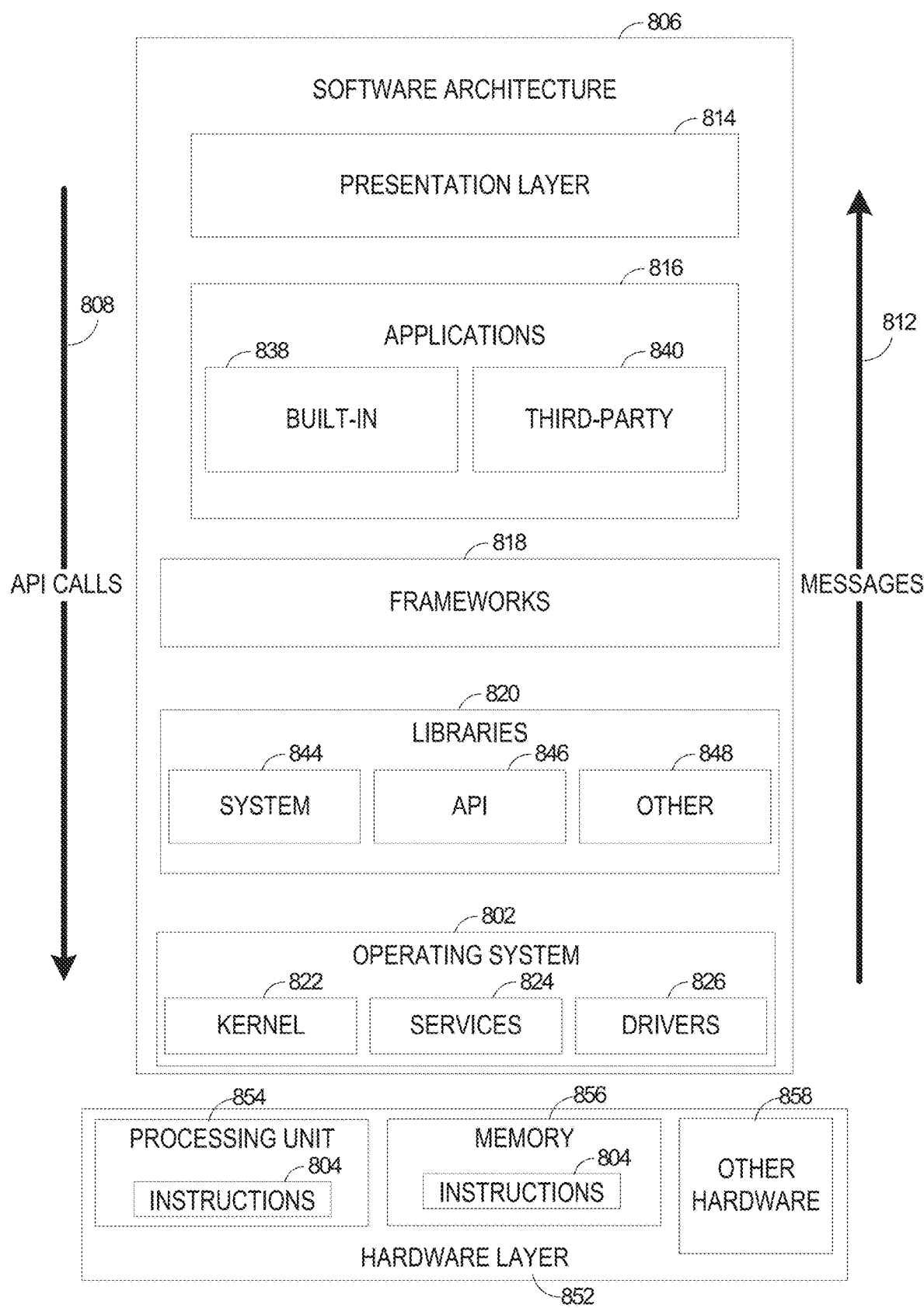
FIG. 8 is a block diagram illustrating a representative software architecture, which may be used in conjunction with various hardware architectures herein described.

Algorithm 1: Bin Routing
Objective: Route blocks into bins based on content.
Assumption: the algorithm is executed during writes when either a full block is written or overwritten or a significant portion of the block is written or overwritten. Small writes are not routed.
Steps:
Block is buffered in memory entirely or partially
If enough data is buffered for the block, execute segmentation algorithm of choice For each segment, compute hash value and store the N minimum hash values (minhashes)
Consult the bloom filters of all bins and choose the bin that has the highest number of matches.
Verify that the chosen bin is not full. If it is full,
force a bloom filter regeneration for the bin
retry step 4
if all bins are full, return error
If last_matched_bin==assigned_bin
last_matched_count++
else
last_matched_bin=assigned_bin
last_matched_count=1
If last_routed_bin !=assigned_bin
if last_matched_count<pressure_threshold
assigned_bin=last_routed_bin
last_routed_bin=assigned_bin
return assigned_bin FIG. 8 is a block diagram illustrating an example software architecture 806, which may be used in conjunction with various hardware architectures herein described. FIG. 8 is a non-limiting example of a software architecture, and it will be appreciated that many other architectures may be implemented to facilitate the functionality described herein. The software architecture 806 may execute on hardware such as a machine 900 of FIG. 9 that includes, among other things, processors, memory, and I/O components. A representative hardware layer 852 is illustrated and can represent, for example, the machine 900 of FIG. 9. The representative hardware layer 852 includes a processing unit 854 having associated executable instructions 804. The executable instructions 804 represent the executable instructions of the software architecture 806, including implementation of the methods, components, and so forth described herein. The hardware layer 852 also includes a memory/storage 856, which also has the executable instructions 804. The hardware layer 852 may also comprise other hardware 858.

In the example architecture of FIG. 8, the software architecture 806 may be conceptualized as a stack of layers where each layer provides functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response in the form of messages 812. The layers illustrated are representative in nature and not all software architectures have all layers. For example, some mobile or special-purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than by interfacing directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. The third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as the operating system 802) to facilitate functionality described herein.

The applications 816 may use built-in operating system functions (e.g., kernel 822, services 824, and/or drivers 826), libraries 820, and frameworks/middleware 818 to create user interfaces to interact with users of the system. Alternatively, or additionally, in some systems, interactions with a user may occur through a presentation layer, such as the presentation layer 814. In these systems, the application/component "logic" can be separated from the aspects of the application/component that interact with a user.

Figure 9:
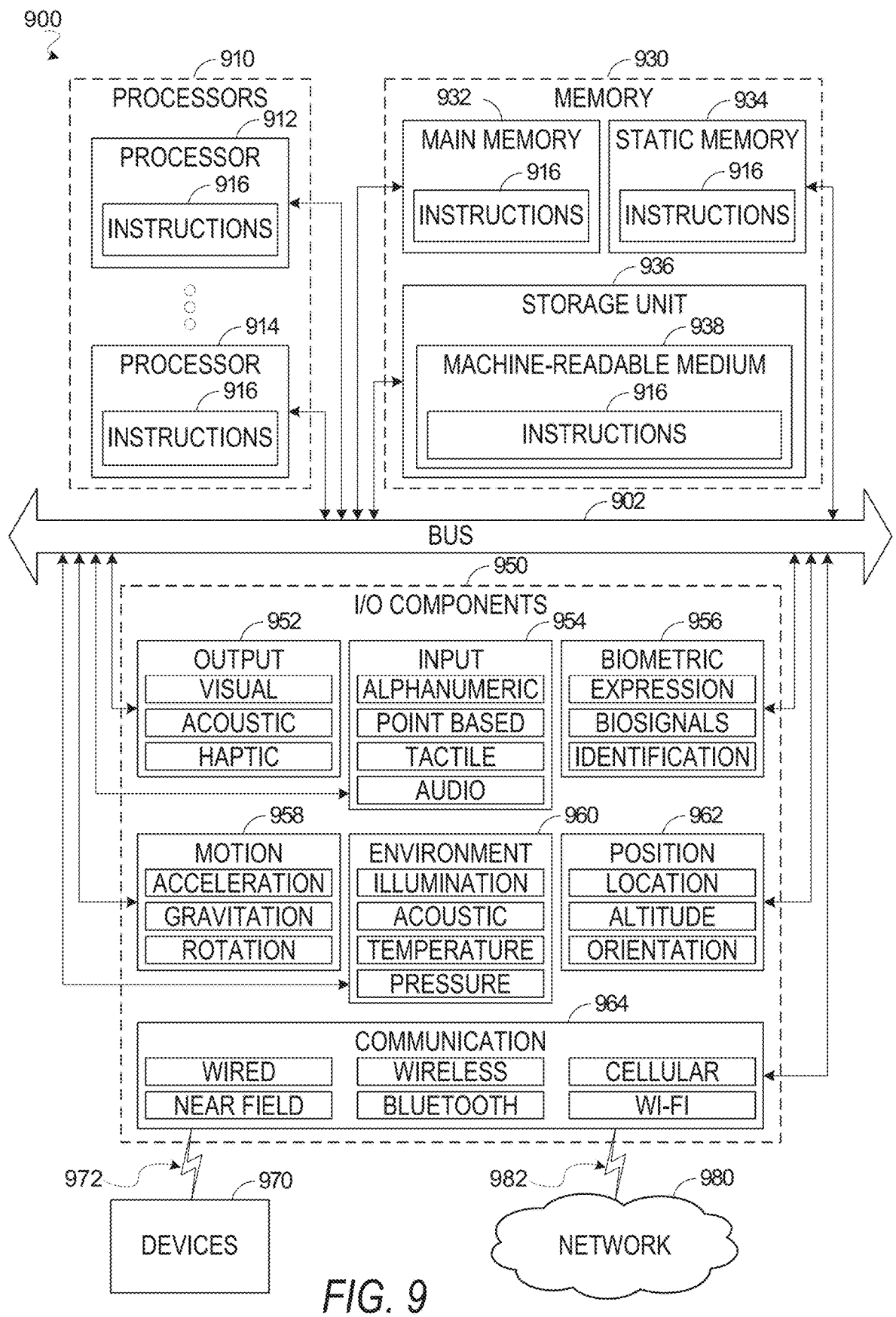
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. As such, the instructions 916 may be used to implement modules or components described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines that individually or jointly execute the instructions 916 to perform any one or more of the methodologies discussed herein.

The machine 900 may include processors 910, memory/storage 930, and I/O components 950, which may be configured to communicate with each other such as via a bus 902. The memory/storage 930 may include a main memory 932, static memory 934, and a storage unit 936, both accessible to the processors 910 such as via the bus 902. The storage unit 936 and main memory 932 store the instructions 916 embodying any one or more of the methodologies or functions described herein. The instructions 916 may also reside, completely or partially, within the static memory 934, within the storage unit 936 (e.g., on machine readable-medium 938), within at least one of the processors 910 (e.g., within the processor cache memory accessible to processors 912 or 914), or any suitable combination thereof, during execution thereof by the machine 900. Accordingly, the main memory 932, static memory 934, the storage unit 936, and the memory of the processors 910 are examples of machine-readable media.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environment components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environment components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, Maxi Code, PDF418, Ultra Code, UCC RSS-2D barcode, and other optical codes), or acoustic detection components (e.g., microphones to identify tagged audio signals), In addition, a variety of information may be derived via the communication components 964, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 916 for execution by the machine 900, and includes digital or analog communications signals or other intangible media to facilitate communication of such instructions 916. Instructions 916 may be transmitted or received over the network 980 using a transmission medium via a network interface device and using any one of a number of well-known transfer protocols.

"CLIENT DEVICE" in this context refers to any machine 900 that interfaces to a network 980 to obtain resources from one or more server systems or other client devices (e.g., client device). A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 980.

"COMMUNICATIONS NETWORK" in this context refers to one or more portions of a network 980 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 980 may include a wireless or cellular network and the coupling 982 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 916 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions 916 (e.g., code) for execution by a machine 900, such that the instructions 916, when executed by one or more processors 910 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 912 or a group of processors 910) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 900) uniquely tailored to perform the configured functions and are no longer general-purpose processors 910.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 912 configured by software to become a special-purpose processor, the general-purpose processor 912 may be configured as respectively different special-purpose processors (e.g., comprising different hardware components) at different times. Software accordingly configures a particular processor 912 or processors 910, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 910 that are temporarily configured (e.g., by software) or permanently configured to perform the relevant operations. Whether temporarily or permanently configured, such processors 910 may constitute processor-implemented components that operate to perform one or more operations or functions described herein. As used herein, "processor-implemented component" refers to a hardware component implemented using one or more processors 910. Similarly, the methods described herein may be at least partially processor-implemented, with a particular processor 912 or processors 910 being an example of hardware. For example, at least some of the operations of a method may be performed by one or more processors 910 or processor-implemented components. Moreover, the one or more processors 910 may also operate to support performance of the relevant operations in a "cloud computing" environment or as a "software as a service" (SaaS). For example, at least some of the operations may be performed by a group of computers (as examples of machines 900 including processors 910), with these operations being accessible via a network 980 (e.g., the Internet) and via one or more appropriate interfaces (e.g., an API). The performance of certain of the operations may be distributed among the processors 910, not only residing within a single machine 900, but deployed across a number of machines 900. In some example embodiments, the processors 910 or processor-implemented components may be located in a single geographic location (e.g., within a home environment, an office environment, or a server farm). In other example embodiments, the processors 910 or processor-implemented components may be distributed across a number of geographic locations.

"PROCESSOR" in this context refers to any circuit or virtual circuit (a physical circuit emulated by logic executing on an actual processor 912) that manipulates data values according to control signals (e.g., "commands," "op codes," "machine code," etc.) and which produces corresponding output signals that are applied to operate a machine 900. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 910 may further be a multi-core processor 910 having two or more independent processors 912, 914 (sometimes referred to as "cores") that may execute instructions 916 contemporaneously.

"TIMESTAMP" in this context refers to a sequence of characters or encoded information identifying when a certain event occurred, for example giving date and time of day, sometimes accurate to a small fraction of a second.

The following are example embodiments relating to optimized lightweight index deduplication.

EXAMPLE 1

A method comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segment having a same position in the first dataset and the second dataset, the duplicate non-aligned segments having different positions in the first dataset and the second dataset.

EXAMPLE 2

The method of example 1, wherein removing duplicate aligned segments comprises: identifying, from the first set of segments, one or more first segments that have the same position as one or more second segments in the second set of segments; determining that the one or more first segments and the one or more second segments at the same position have identical full fingerprints; and replacing, in the second dataset, the one or more second segments with one or more references to the one or more first segments in the first dataset.

EXAMPLE 3

The method of any of examples 1-2, wherein the duplicate non-aligned segments are segments that are determined to not have aligned segments with matching full fingerprints.

EXAMPLE 4

The method of any of examples 1-3, wherein removing the duplicate non-aligned segments comprises: identifying one or more first non-aligned segments in the first dataset that have first shortened fingerprints that match second shortened fingerprints of one or more non-aligned second segments in the second dataset; confirming that the one or more first non-aligned segments identified using the first shortened fingerprint are duplicates of the one or more non-aligned second segments by determining that the one or more first non-aligned segments and the one or more second non-aligned segments have matching full fingerprints; and in response to confirming that the one or more first non-aligned segments and the one or more second non-aligned segments have matching full fingerprints, replacing, in the second dataset, the one or more second non-aligned segments with one or more references to the one or more first non-aligned segments in the first dataset.

EXAMPLE 5

The method of any of examples 1-4, wherein the first set of segments are in a sequential order and the second set of segments are also in the sequential order.

EXAMPLE 6

The method of any of examples 1-5, wherein each position of each segment is an offset specifying a location in the sequential order.

EXAMPLE 7

The method of any of examples 1-6, wherein each full fingerprint of each segment is a hash of the segment.

EXAMPLE 8

The method of any of examples 1-7, wherein the shortened fingerprint of each segment is a truncated portion of the hash of the segment.

EXAMPLE 9

The method of any of examples 1-8, wherein the first index data and the second index data store full fingerprint data and offset data in an extent key value structure with full fingerprints as keys and offsets as values that correspond to the keys.

EXAMPLE 10

The method of any of examples 1-9, wherein the first index data and the second index data store shortened fingerprint data and offset data in a context key value structure with offsets as keys and shortened fingerprints as values that correspond to the keys.

EXAMPLE 11

A system comprising: one or more processors of a machine; a memory storing instructions that, when executed by the one or more processors, cause the machine to perform operations comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segment having a same position in the first dataset and the second dataset, the duplicate non-aligned segments having different positions in the first dataset and the second dataset.

EXAMPLE 12

The system of example 11, wherein removing duplicate aligned segments comprises: identifying, from the first set of segments, one or more first segments that have the same position as one or more second segments in the second set of segments; determining that the one or more first segments and the one or more second segments at the same position have identical full fingerprints; and replacing, in the second dataset, the one or more second segments with one or more references to the one or more first segments in the first dataset.

EXAMPLE 13

The system of any of examples 11-12, wherein the duplicate non-aligned segments are segments that are determined to not have aligned segments with matching full fingerprints.

EXAMPLE 14

The system of any of examples 11-13, wherein removing the duplicate non-aligned segments comprises: identifying one or more first non-aligned segments in the first dataset that have first shortened fingerprints that match second shortened fingerprints of one or more non-aligned second segments in the second dataset; confirming that the one or more first non-aligned segments identified using the first shortened fingerprint are duplicates of the one or more non-aligned second segments by determining that the one or more first non-aligned segments and the one or more second non-aligned segments have matching full fingerprints; and in response to confirming that the one or more first non-aligned segments and the one or more second non-aligned segments have matching full fingerprints, replacing, in the second dataset, the one or more second non-aligned segments with one or more references to the one or more first non-aligned segments in the first dataset.

EXAMPLE 15

The system of any of examples 11-14, wherein the first set of segments are in a sequential order and the second set of segments are also in the sequential order.

EXAMPLE 16

The system of any of examples 11-15, wherein each position of each segment is an offset specifying a location in the sequential order.

EXAMPLE 17

The system of any of examples 11-16, wherein each full fingerprint of each segment is a hash of the segment.

EXAMPLE 18

The system of any of examples 11-17, wherein the shortened fingerprint of each segment is a truncated portion of the hash of the segment.

EXAMPLE 19

The system of any of examples 11-18, wherein the first index data and the second index data store full fingerprint data and offset data in an extent key value structure with full fingerprints as keys and offsets as values that correspond to the keys.

EXAMPLE 20

A machine-readable storage device embodying instructions that, when executed by a machine, cause the machine to perform operations comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segment having a same position in the first dataset and the second dataset, the duplicate non-aligned segments having different positions in the first dataset and the second dataset.

EXAMPLE 21

A method comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by: caching, in a cache, sequential sets of the second shortened fingerprints from the second index data; for every cached sequential set, determining that one or more second shortened fingerprints in the cache matches one or more first shortened fingerprint from the first index data of the first dataset; in response to the one or more second shortened fingerprints in the cache matching the one or more first shortened fingerprints, storing a set of second full fingerprints from the second index data; and removing duplicate segments from the second dataset, in the cache, that match first full fingerprints from the first index data.

EXAMPLE 22

The method of example 21, wherein determining that the one or more second shortened fingerprints matches the one or more first shortened fingerprints comprises: identifying the one or more first shortened fingerprints by determining that the one or more first shortened fingerprints are aligned with the one or more second shortened fingerprints.

EXAMPLE 23

The method of any of examples wherein determining that the one or more first shortened fingerprints matches the one or more second shortened fingerprints comprises: searching the first index data for shortened fingerprints that match the one or more second shortened fingerprints in the cache.

EXAMPLE 24

The method of any of examples 21-23, wherein aligned and non-aligned shortened fingerprints, in the first index data, are searched to identify the one or more first shortened fingerprints that match the one or more second shortened fingerprints.

EXAMPLE 25

The method of any of examples 21-24, wherein the one or more second shortened fingerprints stored in the cache is a sequential set of second shortened fingerprints from the second index data and the set of second full fingerprints is a subsequent sequential set of full fingerprints.

EXAMPLE 26

The method of any of examples 21-25, wherein each full fingerprint of each segment is a hash of the segment.

EXAMPLE 27

The method of any of examples 21-26, wherein the shortened fingerprint of each segment is a truncated portion of the hash of the segment.

EXAMPLE 28

The method of any of examples 21-27, wherein the first index data and the second index data store full fingerprint data and offset data in an extent key value structure with full fingerprints as keys and offsets as values that correspond to the keys.

EXAMPLE 29

The method of any of examples 21-28, wherein the first index data and the second index data store shortened fingerprint data and offset data in a context key value structure with offsets as keys and shortened fingerprints as values that correspond to the keys.

EXAMPLE 30

A system comprising: one or more processors of a machine; a memory storing instructions that, when executed by the one or more processors, cause the machine to perform operations comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by: caching, in a cache, sequential sets of the second shortened fingerprints from the second index data; for every cached sequential set, determining that one or more second shortened fingerprints in the cache matches one or more first shortened fingerprint from the first index data of the first dataset; in response to the one or more second shortened fingerprints in the cache matching the one or more first shortened fingerprints, storing a set of second full fingerprints from the second index data; and removing duplicate segments from the second dataset, in the cache, that match first full fingerprints from the first index data.

EXAMPLE 31

The system of example 30, wherein determining that the one or more second shortened fingerprints matches the one or more first shortened fingerprints comprises: identifying the one or more first shortened fingerprints by determining that the one or more first shortened fingerprints are aligned with the one or more second shortened fingerprints.

EXAMPLE 32

The system of any of examples 30-31, wherein determining that the one or more first shortened fingerprints matches the one or more second shortened fingerprints comprises: searching the first index data for shortened fingerprints that match the one or more second shortened fingerprints in the cache.

EXAMPLE 33

The system of any of examples 30-32, wherein aligned and non-aligned shortened fingerprints, in the first index data, are searched to identify the one or more first shortened fingerprints that match the one or more second shortened fingerprints.

EXAMPLE 34

The system of any of examples 30-33, wherein the one or more second shortened fingerprints stored in the cache is a sequential set of second shortened fingerprints from the second index data and the set of second full fingerprints is a subsequent sequential set of full fingerprints.

EXAMPLE 35

The system of any of examples 30-34, wherein each full fingerprint of each segment is a hash of the segment.

EXAMPLE 36

The system of any of examples 30-35, wherein the shortened fingerprint of each segment is a truncated portion of the hash of the segment.

EXAMPLE 37

The system of any of examples 30-36, wherein the first index data and the second index data store full fingerprint data and offset data in an extent key value structure with full fingerprints as keys and offsets as values that correspond to the keys.

EXAMPLE 38

The system of any of examples 30-37, wherein the first index data and the second index data store shortened fingerprint data and offset data in a context key value structure with offsets as keys and shortened fingerprints as values that correspond to the keys.

EXAMPLE 39

A non-transitory machine-readable storage device embodying instructions that, when executed by a machine, cause the machine to perform operations comprising: generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first fa fingerprint of the given segment; generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by: caching, in a cache, sequential sets of the second shortened fingerprints from the second index data; for every cached sequential set, determining that one or more second shortened fingerprints in the cache matches one or more first shortened fingerprint from the first index data of the first dataset; in response to the one or more second shortened fingerprints in the cache matching the one or more first shortened fingerprints, storing a set of second full fingerprints from the second index data; and removing duplicate segments from the second dataset, in the cache, that match first full fingerprints from the first index data.

EXAMPLE 40

The non-transitory machine-readable storage device of example 39, wherein determining that the one or more second shortened fingerprints matches the one or more first shortened fingerprints comprises: identifying the one or more first shortened fingerprints by determining that the one or more first shortened fingerprints are aligned with the one or more second shortened fingerprints.

EXAMPLE 41

A method comprising: generating, using one or more processors of a machine, an index dataset for each of a plurality of sequential snapshots of a dataset, each sequential snapshot comprising a plurality of segments, each index dataset comprising a full fingerprint and a shortened fingerprint for each segment, each shortened fingerprint for a given segment being a shortened version of a corresponding full fingerprint of the given segment; updating hit counters of one or more of the plurality of sequential snapshots, each hit counter specifying a quantity of times a corresponding snapshot includes a segment that is a duplicate of another segment of a later snapshot; identifying a new snapshot of the dataset for deduplication against the plurality of sequential snapshots; and deduplicating the new snapshot against each of a subset of the plurality of sequential snapshot, the subset of the plurality of sequential snapshots arranged in a descending order according to each sequential snapshot's hit counter.

EXAMPLE 42

The method of example 41, wherein the descending order is greatest to least counts in the hit counters.

EXAMPLE 43

The method of any of examples 41-42, wherein deduplicating the new snapshot against the subset of the plurality of sequential snapshots in the descending order comprises: identifying a snapshot from the plurality of sequential snapshots having a hit counter with the greatest quantity.

EXAMPLE 44

The method of any of examples 41-43, wherein deduplicating the new snapshot against the subset of the plurality of sequential snapshots in the descending order further comprises: removing duplicate segments shared by the new snapshot and the snapshot having the highest hit counter; and identifying a next snapshot in the subset with a next highest quantity in its hit counter.

EXAMPLE 45

The method of any of examples 41-44, wherein two or more hit counters of snapshots in the subset have an identical quantity of hits.

EXAMPLE 46

The method of any of examples 41-45, further comprising: in response to the two or more snapshots in the subset having the identical quantity of hits, selecting one of the snapshots at random for deduplication against the new snapshot.

EXAMPLE 47

The method of any of examples 41-46, wherein there is a preconfigured limit for selecting volumes from the plurality of sequential snapshots for deduplication against the new snapshot of the dataset.

EXAMPLE 48

The method of any of examples 41-47, wherein upon the preconfigured limit being met, the new snapshot is stored as deduplicated against the plurality of sequential snapshots.

EXAMPLE 49

A system comprising: one or more processors of a machine; a memory storing instructions that, when executed by the one or more processors, cause the machine to perform operations comprising: generating an index dataset for each of a plurality of sequential snapshots of a dataset, each sequential snapshot comprising a plurality of segments, each index dataset comprising a full fingerprint and a shortened fingerprint for each segment, each shortened fingerprint for a given segment being a shortened version of a corresponding full fingerprint of the given segment; updating hit counters of one or more of the plurality of sequential snapshots, each hit counter specifying a quantity of times a corresponding snapshot includes a segment that is a duplicate of another segment of a later snapshot; identifying a new snapshot of the dataset for deduplication against the plurality of sequential snapshots; and deduplicating the new snapshot against each of a subset of the plurality of sequential snapshot, the subset of the plurality of sequential snapshots arranged in a descending order according to each sequential snapshot's hit counter.

EXAMPLE 50

The system of example 49, wherein the descending order is greatest to least counts in the hit counters.

EXAMPLE 51

The system of any of examples 49-50, wherein deduplicating the new snapshot against the subset of the plurality of sequential snapshots in the descending order comprises: identifying a snapshot from the plurality of sequential snapshots having a hit counter with the greatest quantity.

EXAMPLE 52

The system of any of examples 49-51, wherein deduplicating the new snapshot against the subset of the plurality of sequential snapshots in the descending order further comprises: removing duplicate segments shared by the new snapshot and the snapshot having the highest hit counter; and identifying a next snapshot in the subset with a next highest quantity in its hit counter.

EXAMPLE 53

The system of any of examples 49-52, wherein two or more hit counters of snapshots in the subset have an identical quantity of hits.

EXAMPLE 54

The system of any of examples 49-53, further comprising: in response to the two or more snapshots in the subset having the identical quantity of hits, selecting one of the snapshots at random for deduplication against the new snapshot.

EXAMPLE 55

The system of any of examples 49-54, wherein there is a preconfigured limit for selecting volumes from the plurality of sequential snapshots for deduplication against the new snapshot of the dataset.

EXAMPLE 56

The system of any of examples 49-55, wherein upon the preconfigured limit being met, the new snapshot is stored as deduplicated against the plurality of sequential snapshots.

EXAMPLE 57

A non-transitory machine-readable storage device embodying instructions that, when executed by a machine, cause the machine to perform operations comprising: generating an index dataset for each of a plurality of sequential snapshots of a dataset, each sequential snapshot comprising a plurality of segments, each index dataset comprising a full fingerprint and a shortened fingerprint for each segment, each shortened fingerprint for a given segment being a shortened version of a corresponding full fingerprint of the given segment; updating hit counters of one or more of the plurality of sequential snapshots, each hit counter specifying a quantity of times a corresponding snapshot includes a segment that is a duplicate of another segment of a later snapshot; identifying a new snapshot of the dataset for deduplication against the plurality of sequential snapshots; and deduplicating the new snapshot against each of a subset of the plurality of sequential snapshot, the subset of the plurality of sequential snapshots arranged in a descending order according to each sequential snapshot's hit counter.

EXAMPLE 58

The non-transitory machine-readable storage device of example 57, wherein the descending order is greatest to least counts in the hit counters.

EXAMPLE 59

The non-transitory machine-readable storage device of any of examples 57-58, wherein deduplicating the new snapshot against the subset of the plurality of sequential snapshots in the descending order comprises: identifying a snapshot from the plurality of sequential snapshots having a hit counter with the greatest quantity.

EXAMPLE 60

The non-transitory machine-readable storage device of any of examples 57-59, wherein deduplicating the new snapshot against the subset of the plurality of sequential snapshots in the descending order further comprises: removing duplicate segments shared by the new snapshot and the snapshot with the highest hit counter; and identifying a next snapshot in the subset with a next highest quantity in its hit counter.

The following are exam embodiments relating to hierarchical snapshot replication. A first set of examples comprises:

EXAMPLE 1

A method for replicating a source cluster snapshot at a remote cluster over a WAN, the method comprising: accessing the snapshot at a source cluster; establishing a replication hierarchy by: storing, in a sparse patch file (P), only written or modified data blocks in the snapshot, as an offset to a data map; generating, based on the patch file, a sparse Extent Index (EI) file, the Extent Index file storing an offset to fingerprint hash or value for each written or modified block present in the patch file; generating, based on the Extent Index, a non-sparse fingerprint (FP) file representing an entire logical space of the snapshot; transmitting or pulling at least one or more of the files in the replication hierarchy over the WAN; and based on the one or more transmitted or pulled files, replicating the snapshot at the remote cluster.

EXAMPLE 2

The method of example 1, further comprising using the Extent Index file to perform a post-replication integrity check by comparing the source or replicated snapshot against another snapshot.

EXAMPLE 3

The method of example 1 or example 2, further comprising using the Extent Index file to perform a deduplication of data to be pulled or transmitted over the WAN.

EXAMPLE 4

The method of any one of examples 1-3, wherein the source cluster snapshot is a most recent snapshot in a series of snapshots at the source cluster and wherein, at the time of replication of the remote snapshot, at least one of the snapshots in the series of snapshots has expired.

EXAMPLE 5

The method of any one of examples 1-4, further comprising using the replication hierarchy to synthesize, at the remote cluster and over the WAN, new files representing the most recent snapshot.

EXAMPLE 6

The method of any one of examples 1-5, wherein the expired snapshot is not replicated at the remote cluster.

EXAMPLE 7

A system comprising: one or more processors of a machine; a memory storing instructions that, when executed by the one or more processors, cause the machine to perform operations in a method for replicating a source cluster snapshot at a remote cluster over a WAN, the operations comprising, at least: accessing the snapshot at a source cluster; establishing a replication hierarchy by: storing, in a sparse patch file (P), only written or modified data blocks in the snapshot, as an offset to a data map; generating, based on the patch file, a sparse Extent Index (EI) file, the Extent Index file storing an offset to fingerprint hash or value for each written or modified block present in the patch file; generating, based on the Extent Index, a non-sparse fingerprint (FP) file representing an entire logical space of the snapshot; transmitting or pulling at least one or more of the files in the replication hierarchy over the WAN; and based on the one or more transmitted or pulled files, replicating the snapshot at the remote cluster.

EXAMPLE 8

The system of example 7, wherein the operations further comprise using the Extent Index file to perform a post-replication integrity check by comparing the source or replicated snapshot against another snapshot.

EXAMPLE 9

The system of example 7 or example 8, wherein the operations further comprise using the Extent Index file to perform a deduplication of data to be pulled or transmitted over the WAN.

EXAMPLE 10

The system of any one of examples 7-9, wherein the source cluster snapshot is a most recent snapshot in a series of snapshots at the source cluster and wherein, at the time of replication of the remote snapshot, at least one of the snapshots in the series of snapshots has expired.

EXAMPLE 11

The system of example 10, wherein the operations further comprise using the replication hierarchy to synthesize, at the remote cluster and over the WAN, new files representing the most recent snapshot.

EXAMPLE 12

The system of example 11, wherein the expired snapshot is not replicated at the remote cluster.

EXAMPLE 13

A machine-readable storage device embodying instructions that, when executed by a machine, cause the machine to perform operations in a method for replicating a source cluster snapshot at a remote cluster over a WAN, the operations comprising, at least accessing the snapshot at a source cluster; establishing a replication hierarchy by: storing, in a sparse patch file (P), only written or modified data blocks in the snapshot, as an offset to a data map; generating, based on the patch file, a sparse Extent Index (EI) file, the Extent Index file storing an offset to fingerprint hash or value for each written or modified block present in the patch file; generating, based on the Extent Index, a non-sparse fingerprint (FP) file representing an entire logical space of the snapshot; transmitting or pulling at least one or more of the files in the replication hierarchy over the WAN; and based on the one or more transmitted or pulled files, replicating the snapshot at the remote cluster.

EXAMPLE 14

The medium of example 13, wherein the operations further comprise using the Extent Index file to perform a post-replication integrity check by comparing the source or replicated snapshot against another snapshot.

EXAMPLE 15

The medium of example 13 or example 14, wherein the operations further comprise using the Extent Index file to perform a deduplication of data to be pulled or transmitted over the WAN.

EXAMPLE 16

The medium of any one of examples 13-15, wherein the source cluster snapshot is a most recent snapshot in a series of snapshots at the source cluster and wherein, at the time of replication of the remote snapshot, at least one of the snapshots in the series of snapshots has expired.

EXAMPLE 17

The medium of example 16, wherein the operations further comprise using the replication hierarchy to synthesize, at the remote cluster and over the WAN, new files representing the most recent snapshot.

EXAMPLE 18

The medium of example 17, wherein the expired snapshot is not replicated at the remote cluster.

A second set of examples comprises:

EXAMPLE 1

A method for replicating a source cluster snapshot at a remote cluster over a WAN, the method comprising: accessing a series of snapshots at a source cluster; generating or identifying, for each snapshot at the source cluster, a replication hierarchy, each replication hierarchy including a sparse patch file (P), a sparse Extent index (EI) file, and a non-sparse fingerprint (FP) file; for a most recent snapshot in the series of snapshots at the source cluster, copying the non-sparse FP file over the WAN at least to initiate establishment of a most recent snapshot at the remote cluster corresponding to the most recent source snapshot; and creating a sparse EI file at the remote cluster for the most recent remote snapshot by pulling the corresponding EI file in the most recent source snapshot, over the WAN, from the source cluster.

EXAMPLE 2

The method of example 1, wherein the series of snapshots at the source cluster includes at least first, second, and third snapshots in a consecutive time-based series, and wherein the third snapshot includes the most recent source snapshot, and wherein the second snapshot has failed or is otherwise unavailable for replication at the remote cluster.

EXAMPLE 3

The method of example 2, wherein each fingerprint in an FP file includes an offset relative to a data map.

EXAMPLE 4

The method of any one of examples 1-3, further comprising comparing each fingerprint in the copied FP file at the remote cluster against a corresponding fingerprint at the same offset in an FP file of the first snapshot.

EXAMPLE 5

The method of example 4, further comprising: based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 6

The method of example 4, further comprising: based on a determination that the compared fingerprints are the same, taking no action in regard to the created EI file at the remote cluster.

EXAMPLE 7

A system comprising: one or more processors of a machine; a memory storing instructions that, when executed by the one or more processors, cause the machine to perform operations in method for replicating a source cluster snapshot at a remote cluster over a WAN, the operations comprising, at least: accessing a series of snapshots at a source cluster; generating or identifying, for each snapshot at the source cluster, a replication hierarchy, each replication hierarchy including a sparse patch file (P), a sparse Extent Index (EI) file, and a non-sparse fingerprint (FP) file; for a most recent snapshot in the series of snapshots at the source cluster, copying the non-sparse FP file over the WAN at least to initiate establishment of a most recent snapshot at the remote cluster corresponding to the most recent source snapshot; and creating a sparse EI file at the remote cluster for the most recent remote snapshot by pulling the corresponding EI file in the most recent source snapshot, over the WAN, from the source cluster.

EXAMPLE 8

The system of example 7, wherein the series of snapshots at the source cluster includes at least first, second, and third snapshots in a consecutive time-based series, and wherein the third snapshot includes the most recent source snapshot, and wherein the second snapshot has failed or is otherwise unavailable for replication at the remote cluster.

EXAMPLE 9

The system of example 8, wherein each fingerprint in an FP file includes an offset relative to a data map.

EXAMPLE 10

The system of example 9, wherein the operations further comprise comparing each fingerprint in the copied FP file at the remote cluster against a corresponding fingerprint at the same offset in an FP file of the first snapshot.

EXAMPLE 11

The system of example 10, wherein the operations further comprise: based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 12

The system of example 10, wherein the operations further comprise: based on a determination that the compared fingerprints are the same, taking no action in regard to the created EI file at the remote cluster.

EXAMPLE 13

A machine-readable storage device embodying instructions that, when executed by a machine, cause the machine to perform operations in method for replicating a source duster snapshot at a remote cluster over a WAN, the operations comprising, at least: accessing a series of snapshots at a source cluster; generating or identifying, for each snapshot at the source cluster, a replication hierarchy, each replication hierarchy including a sparse patch file (P), a sparse Extent Index (EI) file, and a non-sparse fingerprint (FP) file; for a most recent snapshot in the series of snapshots at the source cluster, copying the non-sparse FP file over the WAN at least to initiate establishment of a most recent snapshot at the remote cluster corresponding to the most recent source snapshot; and creating a sparse EI file at the remote cluster for the most recent remote snapshot by pulling the corresponding EI file in the most recent source snapshot, over the WAN, from the source cluster.

EXAMPLE 14

The medium of example 13, wherein the series of snapshots at the source cluster includes at least first, second, and third snapshots in a consecutive time-based series, and wherein the third snapshot includes the most recent source snapshot, and wherein the second snapshot has failed or is otherwise unavailable for replication at the remote cluster.

EXAMPLE 15

The medium of example 14, wherein each fingerprint in an FP file includes an offset relative to a data map.

EXAMPLE 16

The medium of example 15, wherein the operations further comprise comparing each fingerprint in the copied FP file at the remote cluster against a corresponding fingerprint at the same offset in an FP file of the first snapshot.

EXAMPLE 17

The medium of example 16, wherein the operations further comprise: based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 18

The medium of example 16, wherein the operations further comprise: based on a determination that the compared fingerprints are the same, taking no action in regard to the created EI file at the remote cluster.

A third set of examples comprises:

EXAMPLE 1

A method for replicating a source cluster snapshot at a remote cluster over a WAN, the method comprising: accessing a series of snapshots at a source cluster, the series of snapshots at the source cluster including at least first, second, and third snapshots in a consecutive time-based series, and wherein the third snapshot includes a most recent source snapshot, and wherein the second snapshot has failed or is otherwise unavailable for replication at the remote cluster; generating or identifying, for each snapshot in the series of snapshots at the source cluster, a replication hierarchy, each replication hierarchy including a sparse patch file (P), a sparse Extent Index (EI) file, and a non-sparse fingerprint (FP) file wherein each fingerprint in an FP file includes an offset relative to a data map; copying the non-sparse FP file from the third, most recent snapshot over the WAN at least to initiate establishment of a most recent remote snapshot at the remote cluster corresponding to the third snapshot; and creating a sparse EI file at the remote cluster for the most recent remote snapshot by pulling the corresponding EI file from the third snapshot, over the WAN, from the source cluster.

EXAMPLE 2

The method of example 1, further comprising: comparing each fingerprint in the copied FP file at the remote cluster against a corresponding fingerprint at the same offset in an FP file of the first snapshot; and based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 3

The method of example 1 or example 2, wherein the replicated snapshot at the remote cluster is included in a series of replicated snapshots, the series of replicated snapshots including prior snapshots in a consecutive time-based series corresponding to the time-based series of snapshots at the source cluster, each replicated snapshot having an associated replication hierarchy including a P file, an EI file, and an FP file.

EXAMPLE 4

The method of example 3, further comprising, for deduplication, generating a series of remote Content Index (CI) files based on corresponding EI files in the series of replicated snapshots, each CI file including a reverse mapping of a respective EI file, and wherein the series of remote CI files does not include a CI for the most recent snapshot.

EXAMPLE 5

The method of example 4, further comprising: pulling, for the most recent remote snapshot at the remote cluster, the P file from the third snapshot at the source cluster to the remote cluster; identifying a fingerprint first in the series of remote CI files and in the CI file of the most recent replicated snapshot; and based on a fingerprint match, performing deduplication.

EXAMPLE 6

The method of any one of examples 1-5, further comprising performing a post-replication data integrity check, the data integrity check including comparing the FP file of the most recent remote snapshot copied from the source cluster against a corresponding synthesized FP file generated during creation of the EI file at the remote cluster.

EXAMPLE 7

A system comprising: one or more processors of a machine; a memory storing instructions that, when executed by the one or more processors, cause the machine to perform operations in a method for replicating a source cluster snapshot at a remote cluster over a WAN, the operations comprising, at least: accessing a series of snapshots at a source cluster, the series of snapshots at the source cluster including at least first, second, and third snapshots in a consecutive time-based series, and wherein the third snapshot includes a most recent source snapshot, and wherein the second snapshot has failed or is otherwise unavailable for replication at the remote cluster; generating or identifying, for each snapshot in the series of snapshots at the source cluster, a replication hierarchy, each replication hierarchy including a sparse patch file (P), a sparse Extent Index (EI) file, and a non-sparse fingerprint (FP) file wherein each fingerprint in an FP file includes an offset relative to a data map; copying the non-sparse FP file from the third, most recent snapshot over the WAN at least to initiate establishment of a most recent remote snapshot at the remote cluster corresponding to the third snapshot; and creating a sparse EI file at the remote cluster for the most recent remote snapshot by pulling the corresponding EI file from the third snapshot, over the WAN, from the source cluster.

EXAMPLE 8

The system of example 7, wherein the operations further comprise: comparing each fingerprint in the copied FP file at the remote cluster against a corresponding fingerprint at the same offset in an FP file of the first snapshot; and based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 9

The system of example 7, wherein the replicated snapshot at the remote cluster is included in a series of replicated snapshots, the series of replicated snapshots including prior snapshots in a consecutive time-based series corresponding to the time-based series of snapshots at the source cluster, each replicated snapshot having an associated replication hierarchy including a P file, an EI file, and an FP file.

EXAMPLE 10

The system of example 9, wherein the operations further comprise, for deduplication, generating a series of remote Content Index (CI) files based on corresponding EI files in the series of replicated snapshots, each CI file including a reverse mapping of a respective EI file, and wherein the series of remote CI files does not include a CI for the most recent snapshot.

EXAMPLE 11

The system of example 10, wherein the operations further comprise: pulling, for the most recent remote snapshot at the remote cluster, the P file from the third snapshot at the source cluster to the remote cluster; identifying a fingerprint first in the series of remote CI files and in the CI file of the most recent replicated snapshot; and based on a fingerprint match, performing deduplication.

EXAMPLE 12

The system of any one of examples 7-11, wherein the operations further comprise performing a post-replication data integrity check, the data integrity check including comparing the FP file of the most recent remote snapshot copied from the source cluster against a corresponding synthesized FP file generated during creation of the EI file at the remote cluster.

EXAMPLE 13

A machine-readable storage device embodying instructions that, when executed by a machine, cause the machine to perform operations in a method for replicating a source cluster snapshot at a remote cluster over a WAN, the operations comprising, at least: accessing a series of snapshots at a source cluster, the series of snapshots at the source cluster including at least first, second, and third snapshots in a consecutive time-based series, and wherein the third snapshot includes a most recent source snapshot, and wherein the second snapshot has failed or is otherwise unavailable for replication at the remote cluster; generating or identifying, for each snapshot in the series of snapshots at the source cluster, a replication hierarchy, each replication hierarchy including a sparse patch file (P), a sparse Extent Index (EI) file, and a non-sparse fingerprint (FP) file wherein each fingerprint in an EP file includes an offset relative to a data map; copying the non-sparse FP file from the third, most recent snapshot over the WAN at least to initiate establishment of a most recent remote snapshot at the remote cluster corresponding to the third snapshot; and creating a sparse EI file at the remote cluster for the most recent remote snapshot by pulling the corresponding EI file from the third snapshot, over the WAN, from the source cluster.

EXAMPLE 14

The medium of example 13, wherein the operations further comprise: comparing each fingerprint in the copied FP file at the remote cluster against a corresponding fingerprint at the same offset in an FP file of the first snapshot; and based on a determination that the compared fingerprints are different, converting the offsets in the copied FP file at the remote cluster into logical offset in the created EI file at the remote cluster using the replication hierarchy; and pulling offset mappings for the converted offsets based on the series of snapshots at the source cluster and writing these mappings to the created EI file at the remote cluster.

EXAMPLE 15

The medium of example 13, wherein the replicated snapshot at the remote cluster is included in a series of replicated snapshots, the series of replicated snapshots including prior snapshots in a consecutive time-based series corresponding to the time-based series of snapshots at the source cluster, each replicated snapshot having an associated replication hierarchy including a P an EI file, and an FP file.

EXAMPLE 16

The medium of example 15, wherein the operations further comprise, for deduplication, generating a series of remote Content Index (CI) files based on corresponding EI files in the series of replicated snapshots, each CI file including a reverse mapping of a respective EI file, and wherein the series of remote CI files does not include a CI for the most recent snapshot.

EXAMPLE 17

The medium of example 16, wherein the operations further comprise: pulling, for the most recent remote snapshot at the remote cluster, the P file from the third snapshot at the source cluster to the remote cluster; identifying a fingerprint first in the series of remote CI files and in the CI file of the most recent replicated snapshot; and based on a fingerprint match, performing deduplication.

EXAMPLE 18

The medium of example any one of examples 13-17, wherein the operations further comprise performing a post-replication data integrity check, the data integrity check including comparing the FP file of the most recent remote snapshot copied from the source cluster against a corresponding synthesized FP file generated during creation of the EI file at the remote cluster.

Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodi-

What is claimed is:

1. A computer-implemented method comprising:
by a processor, generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment;
by a processor, generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and
by a processor, deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segments having a same position in the first dataset and the second dataset, the duplicate non-aligned segments having different positions in the first dataset and the second dataset.

2. The method of claim 1, wherein removing duplicate aligned segments comprises:
identifying, from the first set of segments, one or more first segments that have the same position as one or more second segments in the second set of segments;
determining that the one or more first segments and the one or more second segments at the same position have identical full fingerprints; and
replacing, in the second dataset, the one or more second segments with one or more references to the one or more first segments in the first dataset.

3. The method of claim 1, wherein the duplicate non-aligned segments have different positions in the first dataset and the second dataset and have matching fingerprints.

4. The method of claim 1, wherein removing the duplicate non-aligned segments comprises:
identifying one or more first non-aligned segments in the first dataset that have first shortened fingerprints that match second shortened fingerprints of one or more second non-aligned segments in the second dataset;
confirming that the one or more first non-aligned segments identified using the first shortened fingerprints are duplicates of the one or more second non-aligned segments by determining that the one or more first non-aligned segments and the one or more second non-aligned segments have matching full fingerprints; and
in response to confirming that the one or more first non-aligned segments and the one or more second non-aligned segments have matching full fingerprints, replacing, in the second dataset, the one or more second non-aligned segments with one or more references to the one or more first non-aligned segments in the first dataset.

5. The method of claim 1, wherein the first set of segments are in a sequential order and the second set of segments are also in the sequential order.

6. The method of claim 5, wherein each position of each segment is an offset specifying a location in the sequential order.

7. The method of claim 1, wherein each full fingerprint of each segment is a hash of the segment.

8. The method of claim 7, wherein the shortened fingerprint of each segment is a truncated portion of the hash of the segment.

9. The method of claim 1, wherein the first index data and the second index data store full fingerprint data and offset data in an extent key value structure with full fingerprints as keys and offsets as values that correspond to the keys.

10. The method of claim 9, wherein the first index data and the second index data store shortened fingerprint data and offset data in a context key value structure with offsets as keys and shortened fingerprints as values that correspond to the keys.

11. A system comprising:
one or more processors of a machine;
a memory storing instructions that, when executed by the one or more processors, cause the machine to perform operations comprising:
generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment;
generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and
deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segments having a same position in the first dataset and the second dataset, the duplicate non-aligned segments having different positions in the first dataset and the second dataset.

12. The system of claim 11, wherein removing duplicate aligned segments comprises:
identifying, from the first set of segments, one or more first segments that have the same position as one or more second segments in the second set of segments;
determining that the one or more first segments and the one or more second segments at the same position have identical full fingerprints; and
replacing, in the second dataset, the one or more second segments with one or more references to the one or more first segments in the first dataset.

13. The system of claim 11, wherein the duplicate non-aligned segments have different positions in the first dataset and the second dataset and have matching fingerprints.

14. The system of claim 11, wherein removing the duplicate non-aligned segments comprises:

identifying one or more first non-aligned segments in the first dataset that have first shortened fingerprints that match second shortened fingerprints of one or more second non-aligned segments in the second dataset;

confirming that the one or more first non-aligned segments identified using the first shortened fingerprints are duplicates of the one or more second non-aligned segments by determining that the one or more first non-aligned segments and the one or more second non-aligned segments have matching full fingerprints; and in response to confirming that the one or more first non-aligned segments and the one or more second non-aligned segments have matching full fingerprints, replacing, in the second dataset, the one or more second non-aligned segments with one or more references to the one or more first non-aligned segments in the first dataset.

15. The system of claim 11, wherein the first set of segments are in a sequential order and the second set of segments are also in the sequential order.

16. The system of claim 15, wherein each position of each segment is an offset specifying a location in the sequential order.

17. The system of claim 11, wherein each full fingerprint of each segments is a hash of the segment.

18. The system of claim 17, wherein the shortened fingerprint of each segment is a truncated portion of the hash of the segment.

19. The system of claim 11, wherein the first index data and the second index data store full fingerprint data and offset data in an extent key value structure with full fingerprints as keys and offsets as values that correspond to the keys.

20. A machine-readable storage device embodying instructions that, when executed by a machine, cause the machine to perform operations comprising:

generating first index data for a first dataset comprising a first set of segments, the first index data comprising a first full fingerprint for each segment in the first set of segments and a first shortened fingerprint for each segment in the first set of segments, each first shortened fingerprint for a given segment being a shortened version of a corresponding first full fingerprint of the given segment;

generating second index data for a second dataset comprising a second set of segments, the second index data comprising a second full fingerprint for each segment in the second set of segments and a second shortened fingerprint for each segment in the second set of segments, each second shortened fingerprint for a given segment being a shortened version of a corresponding second full fingerprint of the given segment; and deduplicating the first dataset and the second dataset by removing duplicate aligned segments using full fingerprints followed by removing duplicate non-aligned segments using shortened fingerprints, the duplicate non-aligned segments being remaining segments not removed as aligned segments, the duplicate aligned segments having a same position in the first dataset and the second dataset, the duplicate non-aligned segments having different positions in the first dataset and the second dataset.

* * * * *